United States Patent
Du et al.

(10) Patent No.: US 11,063,745 B1
(45) Date of Patent: Jul. 13, 2021

(54) DISTRIBUTED LEDGER FOR MULTI-CLOUD SERVICE AUTOMATION

(71) Applicant: EMC IP Holding Company LLC, Hopkinton, MA (US)

(72) Inventors: Lejin Du, Kanata (CA); Ali Kashmar, Ottawa (CA); Ahmed Osama, Cairo (EG); Prasanna S. Patil, Scarsdale, NY (US); Tarek ElBeih, Cairo (EG); Mohamed Yasser, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 607 days.

(21) Appl. No.: 15/895,174

(22) Filed: Feb. 13, 2018

(51) Int. Cl.
*H04L 9/32* (2006.01)
*H04L 9/06* (2006.01)
*H04L 29/08* (2006.01)

(52) U.S. Cl.
CPC .......... *H04L 9/0618* (2013.01); *H04L 9/3247* (2013.01); *H04L 67/104* (2013.01)

(58) Field of Classification Search
CPC ..... H04L 9/3236; H04L 67/10; H04L 67/104; H04L 9/0618; H04L 2209/38;
(Continued)

(56) References Cited

U.S. PATENT DOCUMENTS 6,577,734 B1 6/2003 Etzel et al.
7,814,318 B1 10/2010 Perlman et al.
(Continued)

FOREIGN PATENT DOCUMENTS

CN 103810046 A 5/2014
CN 103870314 A 6/2014
(Continued)

OTHER PUBLICATIONS

U.S. Appl. No. 14/575,080 filed in the name of R. Wallner et al. on Dec. 18, 2014 and entitled "Virtual Network Storage Function Layer Comprising One or More Virtual Network Storage Function Instances."
(Continued)

*Primary Examiner* — Farid Homayounmehr
*Assistant Examiner* — Lizbeth Torres-Diaz
(74) *Attorney, Agent, or Firm* — Ryan, Mason & Lewis, LLP

(57) ABSTRACT

An apparatus in one embodiment comprises at least one processing device having a processor coupled to a memory. The processing device is configured to implement a first ledger node of a first cloud having a first set of cloud resources. The first ledger node of the first cloud is configured to communicate over one or more networks with a plurality of additional ledger nodes associated with respective additional clouds having respective additional sets of cloud resources, to monitor auditable information relating to cloud resources of the first cloud and cloud services provided by the first cloud, to associate the auditable information with one or more cloud service transactions, and to generate a cryptographic block characterizing the one or more cloud service transactions and the associated auditable information. The cryptographic block is entered into a blockchain distributed ledger collectively maintained by the first and additional ledger nodes.

20 Claims, 16 Drawing Sheets

(58) Field of Classification Search
CPC . H04L 2463/102; G06F 21/64; G06F 16/137; G06F 16/1834

See application file for complete search history.

(56) References Cited

U.S. PATENT DOCUMENTS

| | | | |
|---|---|---|---|
| 8,417,747 B1 | 4/2013 | Hayden et al. | |
| 8,650,657 B1 | 2/2014 | Shankar et al. | |
| 8,898,402 B1 | 11/2014 | Stronge | |
| 9,071,429 B1 | 6/2015 | Roth et al. | |
| 9,407,664 B1 | 8/2016 | Banerjee | |
| 10,210,551 B1* | 2/2019 | Todd | G06Q 30/0278 |
| 10,698,879 B1* | 6/2020 | Todd | H04L 67/1097 |
| 10,834,095 B2* | 11/2020 | Irazabal | H04L 9/3239 |
| 2003/0002668 A1 | 1/2003 | Graunke et al. | |
| 2005/0018853 A1 | 1/2005 | Lain et al. | |
| 2006/0282666 A1 | 12/2006 | Kim | |
| 2006/0288232 A1 | 12/2006 | Ho et al. | |
| 2007/0226809 A1 | 9/2007 | Ellard | |
| 2007/0245410 A1 | 10/2007 | Perlman et al. | |
| 2008/0256607 A1 | 10/2008 | Janedittakarn et al. | |
| 2009/0110191 A1 | 4/2009 | Sanvido et al. | |
| 2010/0235649 A1 | 9/2010 | Jeffries et al. | |
| 2011/0158405 A1 | 6/2011 | Choi et al. | |
| 2011/0276713 A1 | 10/2011 | Brand | |
| 2011/0283113 A1 | 11/2011 | Moffat et al. | |
| 2012/0072716 A1 | 3/2012 | Hu et al. | |
| 2012/0173488 A1 | 7/2012 | Spielberg et al. | |
| 2012/0174113 A1 | 7/2012 | Pohlmann | |
| 2012/0180039 A1 | 7/2012 | Bravery et al. | |
| 2012/0278621 A1 | 11/2012 | Woloszyn | |
| 2012/0284528 A1 | 11/2012 | Orovitz | |
| 2013/0145006 A1 | 6/2013 | Tammam | |
| 2013/0305057 A1 | 11/2013 | Greco et al. | |
| 2013/0322621 A1 | 12/2013 | Yoon et al. | |
| 2014/0006802 A1 | 1/2014 | Cachin et al. | |
| 2014/0025963 A1 | 1/2014 | Subramanian | |
| 2014/0068257 A1 | 3/2014 | Burckard | |
| 2014/0068732 A1* | 3/2014 | Hinton | G06F 21/41 726/6 |
| 2014/0274408 A1 | 9/2014 | Dave | |
| 2014/0283010 A1 | 9/2014 | Rutkowski et al. | |
| 2014/0317618 A1* | 10/2014 | Behera | G06F 9/5077 718/1 |
| 2014/0351605 A1 | 11/2014 | De Atley et al. | |
| 2014/0359309 A1 | 12/2014 | Cachin et al. | |
| 2014/0366155 A1* | 12/2014 | Chang | H04L 67/1097 726/27 |
| 2015/0019870 A1 | 1/2015 | Patnala et al. | |
| 2015/0058861 A1 | 2/2015 | Zheng et al. | |
| 2015/0074058 A1 | 3/2015 | Zhao et al. | |
| 2015/0120928 A1 | 4/2015 | Gummaraju et al. | |
| 2016/0259937 A1* | 9/2016 | Ford | G06F 21/577 |
| 2016/0269371 A1 | 9/2016 | Coimbatore | |
| 2016/0321654 A1* | 11/2016 | Lesavich | G06Q 20/321 |
| 2017/0048235 A1* | 2/2017 | Lohe | G06Q 20/065 |
| 2017/0085555 A1* | 3/2017 | Bisikalo | H04L 9/3236 |
| 2017/0214699 A1* | 7/2017 | Johnsrud | H04L 9/3239 |
| 2017/0243212 A1* | 8/2017 | Castinado | H04L 9/3236 |
| 2018/0005186 A1* | 1/2018 | Hunn | G06F 40/103 |
| 2018/0069849 A1* | 3/2018 | Kraemer | H04L 9/3218 |
| 2018/0082296 A1* | 3/2018 | Brashers | G06Q 20/405 |
| 2018/0123882 A1* | 5/2018 | Anderson | H04L 41/0813 |
| 2018/0130130 A1* | 5/2018 | Dechu | G06Q 40/04 |
| 2018/0337769 A1* | 11/2018 | Gleichauf | H04L 9/3247 |
| 2018/0374037 A1* | 12/2018 | Nazzari | G06F 21/64 |
| 2019/0102409 A1* | 4/2019 | Shi | H04L 67/2823 |
| 2019/0108482 A1* | 4/2019 | Vikas | G06Q 10/0838 |
| 2019/0149429 A1* | 5/2019 | Stocker | H04L 67/104 709/225 |
| 2019/0268284 A1* | 8/2019 | Karame | H04L 9/3236 |
| 2019/0325436 A1* | 10/2019 | Cheng | G06Q 20/3827 |
| 2019/0342095 A1* | 11/2019 | Simons | H04L 63/12 |
| 2020/0050494 A1* | 2/2020 | Bartfai-Walcott | G06F 9/5083 |
| 2020/0051076 A1* | 2/2020 | Cichocki | G06Q 20/389 |
| 2020/0074410 A1* | 3/2020 | Binder | G06Q 30/018 |
| 2020/0112833 A1* | 4/2020 | Cheong | H04W 4/029 |
| 2020/0226679 A1* | 7/2020 | Li | G06Q 40/08 |
| 2020/0234817 A1* | 7/2020 | De Armas | G16H 40/20 |
| 2020/0272619 A1* | 8/2020 | Alferov | G06Q 50/265 |
| 2020/0280443 A1* | 9/2020 | Simons | H04L 63/12 |
| 2020/0302448 A1* | 9/2020 | Wagner | G06Q 30/0185 |
| 2020/0313982 A1* | 10/2020 | Todd | H04L 41/5006 |
| 2020/0396065 A1* | 12/2020 | Gutierrez-Sheris | H04L 9/3247 |

FOREIGN PATENT DOCUMENTS

| | | |
|---|---|---|
| CN | 104104513 A | 10/2014 |
| EP | 1414181 A1 | 4/2004 |

OTHER PUBLICATIONS sysdig.org, "Universal System Visibility with Native Container Support," 2015, 3 pages.

Encomium to Technology, "Dissecting Docker Security—Part 1," http://goo.gl/35Jr9D, Aug. 12, 2015, 3 pages.

Encomium to Technology, "Aesthetics of Linux Security Modules," http://goo.gl/x12gJD, Aug. 12, 2015, 3 pages.

Netlink, "Linux Programmer's Manual," http://man7.org/linux/man-pages/man7/netlink.7.html, Jan. 10, 2015, 7 pages.

U.S. Appl. No. 14/752,153 filed in the name of R. Wallner et al. on Jun. 26, 2015 and entitled "Coordinated Resource Allocation Between Container Groups and Storage Groups."

U.S. Appl. No. 14/819,920 filed in the name of Radia Perlman on Aug. 6, 2015 and entitled "Storage System Comprising Per-Tenant Encryption Keys Supporting Deduplication Across Multiple Tenants."

U.S. Appl. No. 14/820,026 filed in the name of Vaibhav Khanduja et al. on Aug. 6, 2015 and entitled "Provisioning Isolated Storage Resource Portions for Respective Containers in Multi-Tenant Environments."

U.S. Appl. No. 14/939,562 filed in the name of Vaibhav Khanduja on Nov. 12, 2015 and entitled "Intrusion Detection for Storage Resources Provisioned to Containers in Multi-Tenant Environments."

U.S. Appl. No. 15/268,788 filed in the name of Misha Nossik et al. on Sep. 19, 2016 and entitled "Secure Data Access in Cloud Computing Environments."

U.S. Appl. No. 15/075,858 filed in the name of Misha Nossik et al. on Mar. 21, 2016 and entitled "Security Layer for Containers in Multi-Tenant Environments."

Clearsky Data, "Welcome to the Global Storage Network Plug In," Data Sheet, 2016, 2 pages.

Velostrata Inc., "Velostrata Move Production Workloads to a Public Cloud in Minutes," Data Sheet, 2016, 2 pages.

U.S. Appl. No. 15/473,848 filed in the name of Misha Nossik et al. on Mar. 30, 2017 and entitled "Distributed Ledger for Peer-to-Peer Cloud Resource Sharing."

* cited by examiner

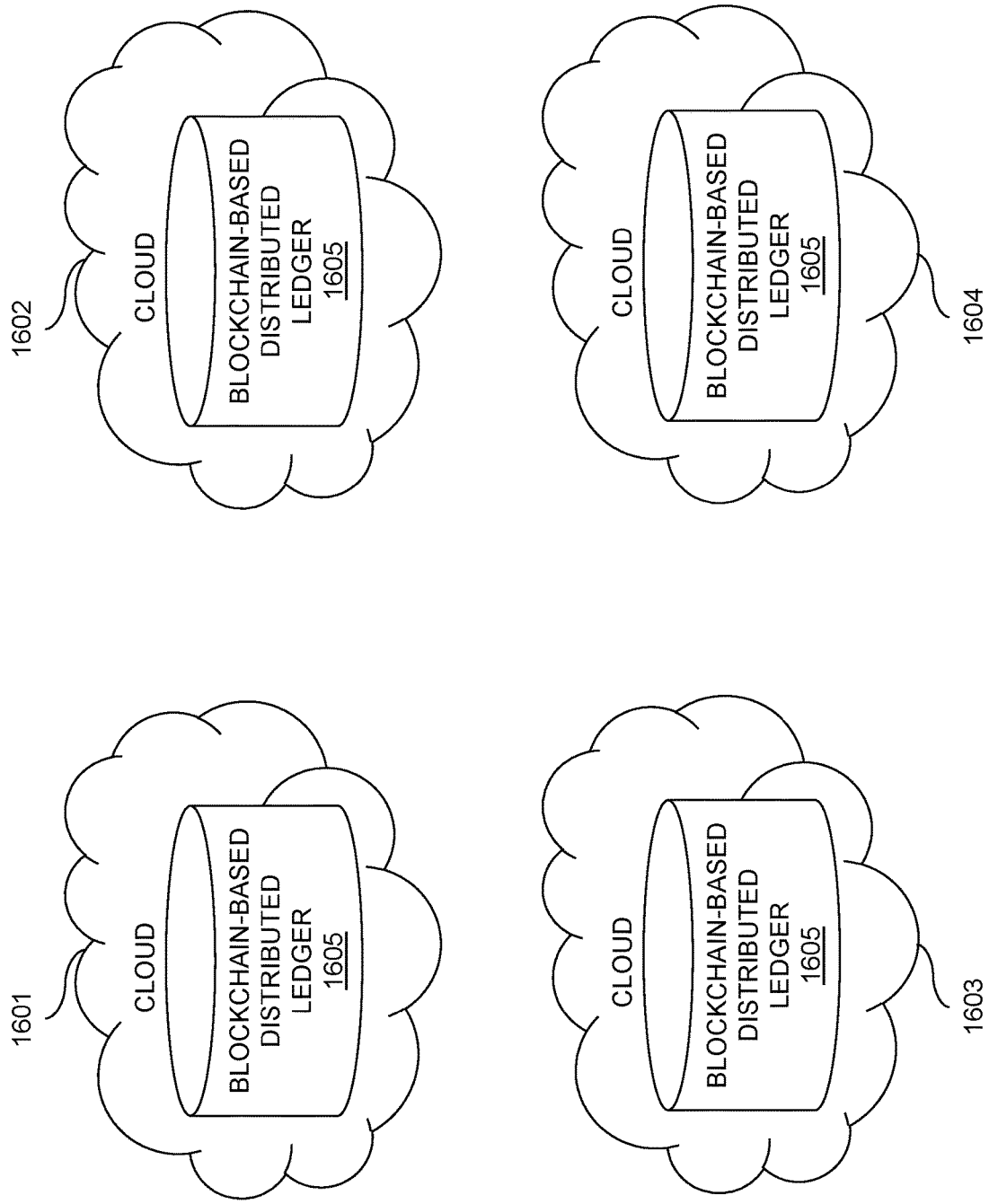

DISTRIBUTED LEDGER FOR MULTI-CLOUD SERVICE AUTOMATION

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to provision cloud services in multi-cloud environments.

SUMMARY

Illustrative embodiments are configured to facilitate automation of cloud services in multi-cloud environments through peer-to-peer implementation of a distributed ledger.

In one embodiment, an apparatus comprises at least one processing device comprising a processor coupled to a memory, wherein the processing device is configured to implement a first ledger node of a first cloud having a first set of cloud resources. The first ledger node of the first cloud is configured to communicate over one or more networks with a plurality of additional ledger nodes associated with respective additional clouds having respective additional sets of cloud resources, to monitor auditable information relating to cloud resources of the first cloud and cloud services provided by the first cloud, to associate the auditable information with one or more cloud service transactions, and to generate a cryptographic block characterizing the one or more cloud service transactions and the associated auditable information. The cryptographic block is entered into a blockchain distributed ledger collectively maintained by the first and additional ledger nodes.

These and other illustrative embodiments described herein include, without limitation, methods, apparatus, systems, and computer program products comprising processor-readable storage media.

BRIEF DESCRIPTION OF THE DRAWINGS

FIG. 16 is a block diagram of a distributed ledger in a multi-cloud environment in an illustrative embodiment.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments.

Figure 1:
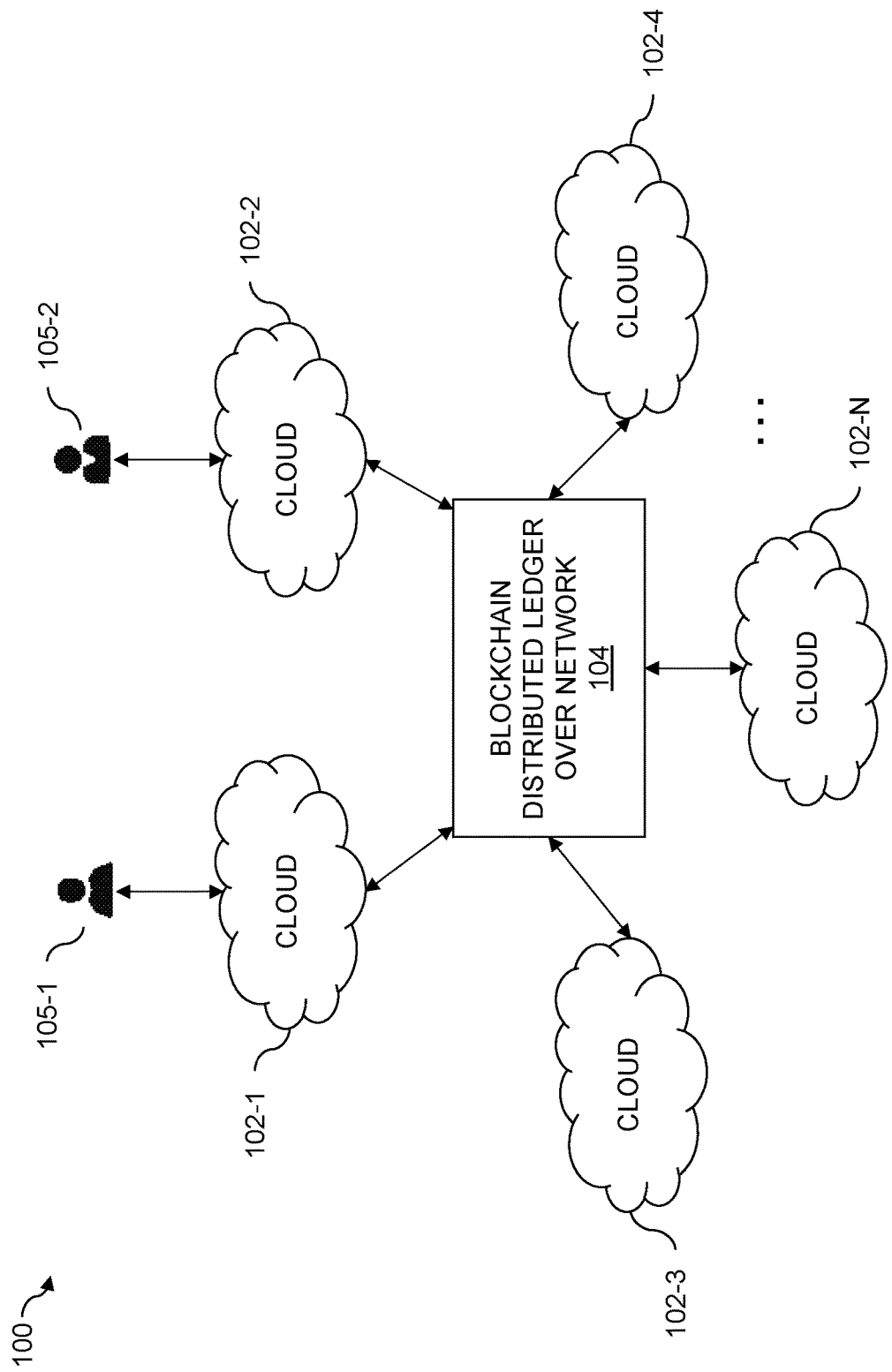
FIG. 1 is a block diagram of an information processing system comprising a distributed ledger for cloud services automation in an illustrative embodiment.

FIG. 1 shows an information processing system 100 comprising a plurality of clouds 102-1, 102-2, 102-3, 102-4, ... 102-N (collectively, clouds 102). The clouds 102 in this embodiment are assumed to be private clouds of respective enterprises or other entities. Each of the clouds 102 has one or more users. For example, clouds 102-1 and 102-2 have respective users 105-1 and 105-2. The clouds 102 have respective sets of cloud resources, such as compute, storage and network resources, in various configurations. The clouds 102 interact with one another over one or more networks that are not explicitly shown in order to collectively implement a peer-to-peer blockchain distributed ledger 104.

Although the clouds 102 in this embodiment are illustratively implemented as respective private clouds, in other embodiments one or more of the clouds 102 may each comprise a hybrid cloud that includes both private cloud and public cloud components. A wide variety of other private, public, hybrid or multi-cloud arrangements can be used.

The clouds 102 in this embodiment are more particularly assumed to comprise respective ledger nodes, although the ledger nodes are not explicitly shown in this figure. For example, the first cloud 102-1 is assumed to comprise a first ledger node, and the other clouds are assumed to comprise respective additional ledger nodes.

The first ledger node of the first cloud 102-1 is illustratively configured to communicate over the above-noted network(s) with the additional ledger nodes associated with respective additional ones of the clouds 102. The first and additional ledger nodes collectively maintain the blockchain distributed ledger 104. More particularly, the first and additional ledger nodes collectively maintain the blockchain distributed ledger 104 on a peer-to-peer basis without utilizing a centralized transaction authority.

The blockchain distributed ledger 104 collectively maintained by the ledger nodes of the respective clouds 102 illustratively provides a first ledger system that in some embodiments is configured to interface to one or more additional ledger systems maintained by respective sets of ledger nodes associated with other cloud groupings.

The first ledger node of the first cloud 102-1 may be configured to establish cloud service transactions with one or more of the additional ledger nodes of the additional clouds 102, to generate corresponding cryptographic blocks characterizing the cloud service transactions for entry into the blockchain distributed ledger 104.

In some embodiments, the first ledger node of the first cloud 102-1 may be configured to establish cloud resource sharing transactions with at least one of the additional ledger nodes of the additional clouds 102, such as a second ledger node of the second cloud 102-2, to generate a corresponding cryptographic block characterizing the cloud resource sharing transaction. The cryptographic block is then entered into the blockchain distributed ledger 104 collectively maintained by the first and additional ledger nodes. For example, the cryptographic block may be entered after designated amounts of verification computations are successfully performed on that block within the ledger system. Numerous other techniques can be used to allow one or more ledger nodes or other ledger system entities to enter cryptographic blocks characterizing respective cloud resource sharing transactions, or more generally cloud service transactions or cloud service contracts, into the blockchain distributed ledger 104. Additional details regarding establishment of cloud sharing transactions and generating of corresponding cryptographic blocks characterizing the cloud resource sharing transactions are described in U.S. patent application Ser. No. 15/472,848, filed Mar. 30, 2017 and entitled "Distributed Ledger for Peer-to-Peer Cloud Resource Sharing," the disclosure of which is incorporated by reference herein in its entirety.

A blockchain distributed ledger in some embodiments is implemented at least in part in the form of a distributed database across a public network that maintains a continuously-growing list of records more generally referred to herein as "blocks." Each block illustratively contains a timestamp and a link to a previous block. The blocks are generated using cryptographic techniques in order to allow each participant on the public network to manipulate the blocks in a secure way without the need for a central authority.

For example, cloud service transactions such as cloud resource publishing and validation transactions, cloud resource provider reputation gauge transactions, cloud service contract execution transactions, etc. may be entered as corresponding respective blocks into the distributed blockchain ledger, with each block referencing the previous block and being secured from tampering and revision through the use of designated cryptographic techniques. A given block is added to the blockchain distributed ledger only after successful cryptographic verification.

In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities.

The blockchain distributed ledger is illustratively configured to provide transparency and immutability of cloud service transactions, in that changes to the blockchain distributed ledger are publicly viewable by all participants and the corresponding transactions cannot be altered or deleted. Overhead costs are significantly reduced in these and other illustrative embodiments by eliminating the need for a centralized authority or other similar third party intermediary.

The clouds 102 and other clouds referred to herein are illustratively implemented by cloud infrastructure comprising one or more processing platforms. Although the present embodiment utilizes private clouds, the term "cloud" as used herein is intended to be more broadly construed and may comprise a private cloud, a public cloud, a hybrid cloud or combinations of multiple clouds of different types.

The cloud resources implemented by the clouds 102 can include container-based compute functionality and associated storage systems. Such storage systems in some embodiments are configured to store data under the control of its associated entity and are assumed to be part of the corresponding cloud.

A given one of the clouds 102 illustratively comprises a plurality of host devices configured to support execution of applications on behalf of multiple users, although such host devices are not explicitly shown in the figure. For example, the host devices of a given one of the clouds 102 may comprise respective container host devices. Cloud native applications can execute in respective application containers implemented utilizing the container host devices. The container host devices may comprise Docker containers, LXD containers, Cloud Foundry Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

One or more of the clouds 102 can each be implemented using a layered architecture. For example, such a cloud can comprise a Platform-as-a-Service (PaaS) layer overlying an Infrastructure-as-a-Service (IaaS) layer. The IaaS layer may illustratively comprise a plurality of virtual machines configured to support application containers or other containers of the PaaS layer of the cloud.

A storage system of a given one of the clouds 102 illustratively includes at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC of Hopkinton, Mass.

Different combinations of these and numerous other storage products can also be used in implementing a given storage platform in an illustrative embodiment. Additional examples of storage products that may be used in other embodiments include VNX® and Symmetrix VMAX® storage arrays, all-flash and hybrid flash storage arrays such as Unity™, object-based storage products such as Atmos®, scale-out all-flash storage arrays such as XtremIO™, and software-defined storage products such ViPR®, also from Dell EMC. Combinations of multiple ones of these and other storage products can also be used in implementing a given storage platform in an illustrative embodiment.

Blockchain-based distributed ledgers, such as blockchain distributed ledger 104, may be configured to provide point-to-point (P2P) broker functions for multi-cloud services of the clouds 102. The immutable property of blockchain-based distributed ledgers further allows for multi-cloud service automation. In some embodiments, a P2P multi-cloud service automation platform is provided for publishing and validating cloud resources, for evaluating the service quality of clouds of cloud service providers (also referred to herein as cloud providers), and to automate cloud service processes, such as cloud service contract execution. The P2P multi-cloud service automation platform in some embodiments is based on a permissioned blockchain, which allows access to invited and verified clouds.

In some multi-cloud service implementations, cloud resources may be advertised and consumed, and cloud services may be contracted across clouds via a centralized marketplace. For such implementations, many manual procedures are involved for providing cloud services, and a third-party authority is required to manage and control the marketplace. Such approaches, however, suffer from a number of disadvantages.

One disadvantage is that cloud services for enterprise applications cannot be executed automatically across multiple clouds. Today, enterprise applications may be viewed as one of two types—old or legacy applications built without the cloud in mind and new applications which are developed with the cloud in mind. Many old and legacy applications are based on monolithic, multi-tier architectures that use middleware, such as application servers and relational databases. New applications developed with the cloud in mind, also referred to as cloud-native applications, are typically designed to run in containerized runtime environments. Old and new enterprise applications can be automated for provisioning and configuration in support of dynamic allocation of required resources in various types of cloud environments, such as private clouds, public cloud accounts, and hybrid clouds (e.g., combinations of private clouds and public cloud accounts). These cloud environments are typically owned by a single enterprise in terms of application development. The number of supported clouds is thus small and cloud resources are limited. When enterprises and managed cloud providers want to realize the economics of large shared cloud resources, they must automate enterprise applications across a large number of clouds, possibly with different owners. Effective mechanisms and tools are needed to perform this automation.

Another disadvantage is in the lack of methods for providing proof of resources. Cloud services may involve cloud resource sharing across multiple clouds with associated cloud resources. Proof of cloud resources is thus a key step in cloud service automation. While there are some approaches focused on proof of data possession, there is a need for solutions for providing proof of resources in cloud environments (e.g., proof of cloud compute and storage resources).

Further disadvantages include the lack of methods for determining service quality or reputation of the clouds provided by different cloud providers. With the rapid growth of cloud computing, there is a growing need for a reputation system for cloud computing services. Some approaches emphasize consumer-provider two-way reputation evaluations. There is a need, however, to better address the challenges of reputation evaluation in cloud computing, including the diverse nature of cloud services and intricacy of malicious ratings. More effective reputation systems are needed which include a number of factors in addition to consumer-provider two-way reputation evaluations. Such factors include third-party participation in reputation gauging for more computation power and fairness, statistics data assessment during cloud services, links to service contract processes, etc.

Other disadvantages include the lack of methods for service contract consensus on multi-clouds. Many cloud service contract methods today are consumer-provider based. Cloud consumers select the clouds of cloud providers on the cloud providers' terms, and the selection is mainly a manual process. Such methods have one-to-one relationships. In multi-cloud environments, there are many organizations as the cloud providers and many organizations as the cloud service consumers. In some cases, the same organization or entity may act as both a cloud provider and a cloud service consumer, possibly at the same time. This many-to-many relationship arrangement requires new methods to award cloud service contracts. In order to make selection processes fair, it is desired to have multiple organizations or entities (e.g., clouds of multiple cloud providers) participate for consensus.

Some embodiments overcome one or more of these and other disadvantages through the use of a new service automation system established on blockchain networks across multiple clouds. Secure communications among the clouds of different cloud providers is achieved using an on-chain ledger and smart contracts. Each cloud provider may functions as an endorsing peer, which validates and executes smart contracts. Smart contracts are provided as chain code on a blockchain distributed ledger.

Figure 2:
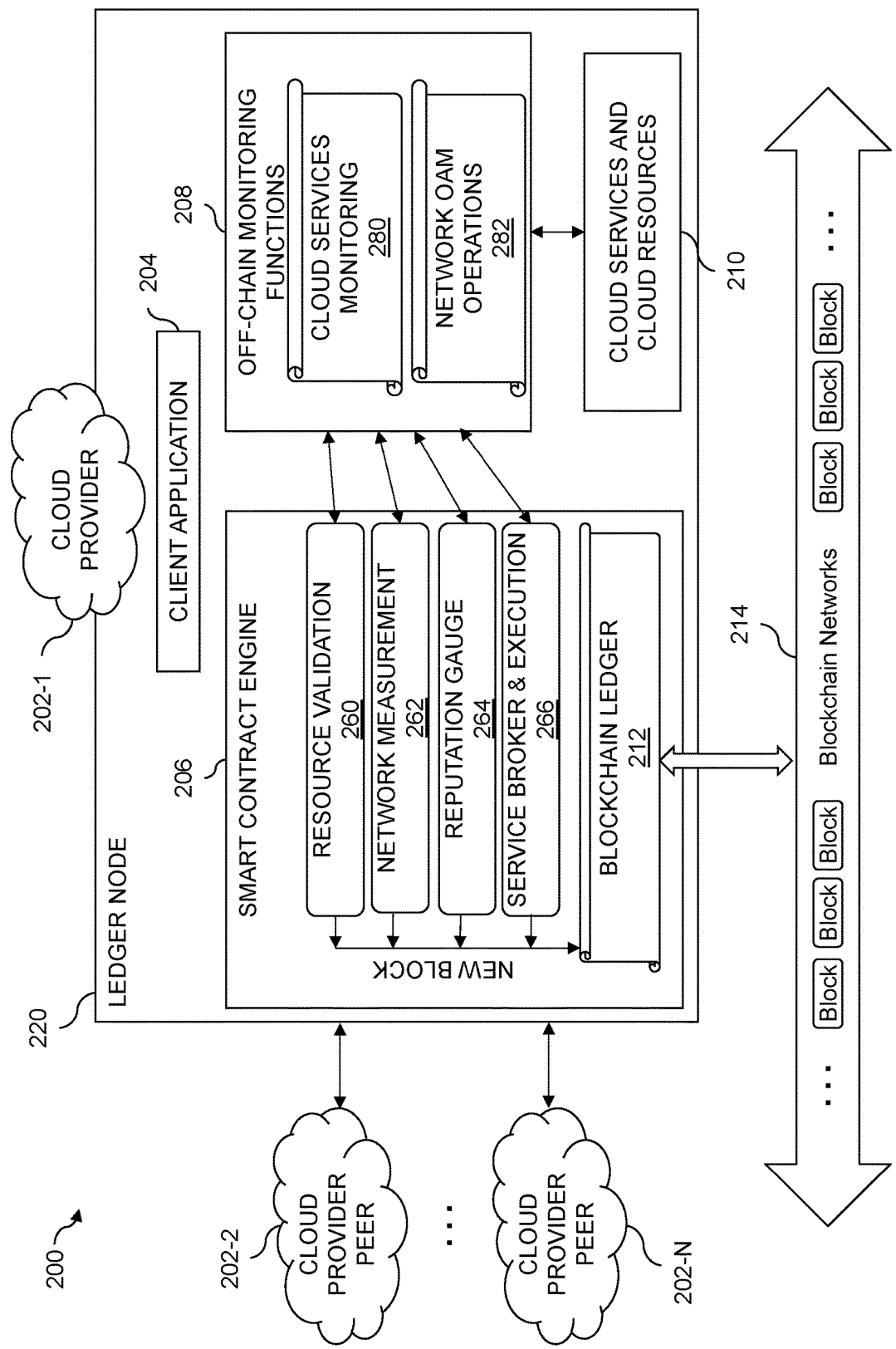
FIG. 2 is a block diagram of an information processing system implementing a distributed ledger for cloud services automation in an illustrative embodiment.

FIG. 2 shows an information processing system 200, including a cloud provider 202-1 (e.g., an operator of cloud 102-1 in information processing system 100) and one or more cloud provider peers 202-2, . . . 202-N (e.g., operators of clouds 102-2, . . . 102-N in information processing system 100). It is to be appreciated that there is not necessarily a one-to-one correspondence between cloud providers and clouds in a multi-cloud environment. In some cases, one cloud provider may operate or provide multiple clouds in a multi-cloud environment. Further, it is assumed that each of the cloud provider peers 202-2, . . . 202-N is configured in a manner similar to that shown as cloud provider 202-1.

The cloud provider 202-1 is shown as implementing a ledger node 220 including a client application 204, a smart contract engine 206, off-chain monitoring functions 208, and cloud services and resources 210. The off-chain monitoring functions 208 feed smart contracts with auditable information of the cloud services and resources 210. The client application 204 runs locally on each cloud of the cloud provider 202-1, providing an interface between cloud service users and the cloud services automation system.

The smart contract engine 206 is configured to generate a number of smart contracts, such as resource validation smart contracts 260, network measurement smart contracts 262, reputation gauge smart contracts 264 and service broker and execution smart contracts 266. The smart contracts generated by the smart contract engine 206 are stored as new blocks on the blockchain ledger 212. The off-chain monitoring functions 208 include cloud services monitoring 280 and network operations, administration and management (OAM) operations 282. The client application 204 provides an interface for cloud service users, and may be controlled by a cloud administrator of the cloud provider 202-1.

In order to provide service automation, various digital assets are stored in the blockchain ledger 212. For example, information regarding cloud resources, cloud provider reputations, network measurements, service contracts and currency may be stored in the blockchain ledger 212. The information regarding cloud resources may include virtual central processing unit (CPU) or vCPU in number of gigahertz (GHz), random access memory (RAM) in gigabytes (GB), storage in number of GB, network bandwidth in number of megabits per second (Mbit/s), disk input/output operations per second (TOPS), etc. The information regarding cloud provider reputations may include reputation scores for different cloud providers in some designated range (e.g., a score between 0 and 100). The network information may include per consumer point to multipoint (P2M) latency in milliseconds or other network measurements. The service contracts information may include, for each service contract: a service start time, duration and actual completion time; a service cost; cloud resources utilized by the service; and encrypted access credentials. The currency information may include money or other form of payment that is used to pay for the cloud resources. The currency information may be dynamically increased or decreased as desired by the cloud providers.

The smart contract engine 206 of cloud provider 202-1 is configured to generate cryptographic blocks characterizing smart contracts or more generally cloud service transactions for entry into blockchain network 214.

It should be noted that a "blockchain network" as that term is broadly used herein is intended to encompass a wide variety of different types of network interactions associated with maintenance of a blockchain distributed ledger. Such interactions can take place over multiple distinct physical networks of different types.

The blockchain networks 214 and associated interactions between the smart contract engine 206 of cloud provider 202-1 and other smart contract engines of cloud provider peers 202-2, ... 202-N provide a blockchain based distributed broker arrangement for cloud services automation in a multi-cloud environment. The cloud provider 202-1 and cloud provider peers 202-2, ... 202-N may be referred to herein as providing ledger nodes for blockchain networks 214. The blockchain based distributed broker arrangement may by a peer-to-peer arrangement that is fully decentralized across the participating clouds such that no third party transaction authority is utilized.

The cloud provider 202-1 and cloud provider peers 202-2, ... 202-N implement smart contract functionality for multi-cloud service automation. The blockchain networks 214 are collectively maintained by the cloud provider 202-1 and cloud provider peers 202-2, ... 202-N. The smart contract engine 206 of cloud provider 202-1, for example, generates cryptographic blocks that are entered into one or more distributed ledgers of the blockchain networks 214. Each such cryptographic block illustratively characterizes one or more smart contracts (e.g., for resource validation 260, network measurement 262, reputation gauge 264 and service broker and execution 266). The distributed ledger, represented as blockchain ledger 212 in FIG. 2, is collectively maintained by the cloud or clouds of cloud provider 202-1 and additional clouds of cloud provider peers 202-2, ... 202-N.

The smart contract engine 206 is more particularly configured to generate a cryptographic block ("new block") as a function of one or more smart contracts and associated data maintained by the smart contract engine 206. The smart contracts in some embodiments comprise a resource validation contract 260 and associated data, a network measurement contract 262 and associated data, a reputation gauge contract 264 and associated data, a service broker and execution contract 266 and associated data, etc. It is to be appreciated that additional or alternative contracts can be used in other embodiments, including but not limited to cryptocurrency contracts and associated data.

A given instance of a cryptocurrency contract illustratively specifies a type and amount of cryptocurrency to be received by one of the clouds of the cloud providers for utilization of its cloud resources by another one of the clouds. Examples of cryptocurrency contracts that may be utilized in illustrative embodiments include those associated with cryptocurrencies such as Bitcoin, Ethereum and Hyperledger. The use of cryptocurrency contracts in illustrative embodiments ensures a common cloud currency and payment system for all participating clouds in the distributed ledger system.

A given instance of a resource validation contract illustratively specifies proof of resources for one or more clouds of a cloud provider. Processes for resource validation and publishing for use in generating resource validation contracts will be described in further detail below with respect to the flow diagram of FIG. 3.

A given instance of a network measurement contract illustratively provides measurements of network capabilities of the clouds of different cloud providers. Processes for network measurement of cloud providers for use in generating network measurement contracts will be described in further detail below with respect to the flow diagram of FIG. 4.

A given instance of the reputation gauge contract in some embodiments specifies a dual reputation score for a cloud provider. This dual reputation includes (1) a reputation of the cloud provider as a provider of cloud services using its own cloud resources and (2) a reputation of the cloud provider as a consumer of cloud services using cloud resources of one or more other clouds of one or more other cloud providers. In other embodiments, a given instance of a reputation gauge contract may specify only (1) or (2). In some embodiments, the reputation gauge contract can generate pairs of such provider-consumer scores at each of a plurality of different stages in the execution of a cloud service contract, including generation of scores at runtime, partial or intermediate points and service completion.

The reputation gauge scores are illustratively generated in real time by smart contract engines of the cloud provider 202-1 and cloud provider peers 202-2, ... 202-N based on actual performance in cloud service contract execution.

In some embodiments, a given cloud service contract completion report includes both a request cloud contract fulfillment report and an offer cloud contract fulfillment report. The request cloud contract fulfillment report is utilized in computing the reputation gauge score for the requesting cloud and the offer cloud contract fulfillment report is utilized in computing the reputation gauge score for the offering cloud. Thus, the reputation gauge for a given cloud of the system includes separate reputation scores for that cloud as respective provider and consumer of cloud services. The reputation gauge characterizes a history of contract fulfillment of the given cloud and is available to the other clouds that are ledger members as well as other system entities such as users. The reputation gauge is carried as part of a reputation gauge contract characterized by one or more blocks that are generated by a smart contract engine of a cloud provider and entered into the distributed ledger.

The reputation gauge in some embodiments is generated using a machine learning process. For example, each time performance under a cloud service contract is completed, separate smart contracts for reputation calculation of the participating clouds are generated, one for the provider cloud and one for the consumer cloud. All ledger members can execute the reputation gauge contracts and the results are permanently entered into reputation gauge accounts of the respective contract participants. Similar techniques can be used for partial results of provider and consumer performance under a cloud service contract. For example, during service runtime, partial results may be generated for a given cloud service contract based on real-time monitoring of the in-process performance of the consumer and provider clouds. The corresponding reputation gauge scores are reflected in reputation gauge contracts that are used to generate blocks for entry into the distributed ledger.

Failure of certain clouds to maintain designated minimum reputation gauge scores over time can serve to limit the ability of those clouds to enter cloud service contracts, and possibly lead to revocation of ledger memory status.

Figure 5:
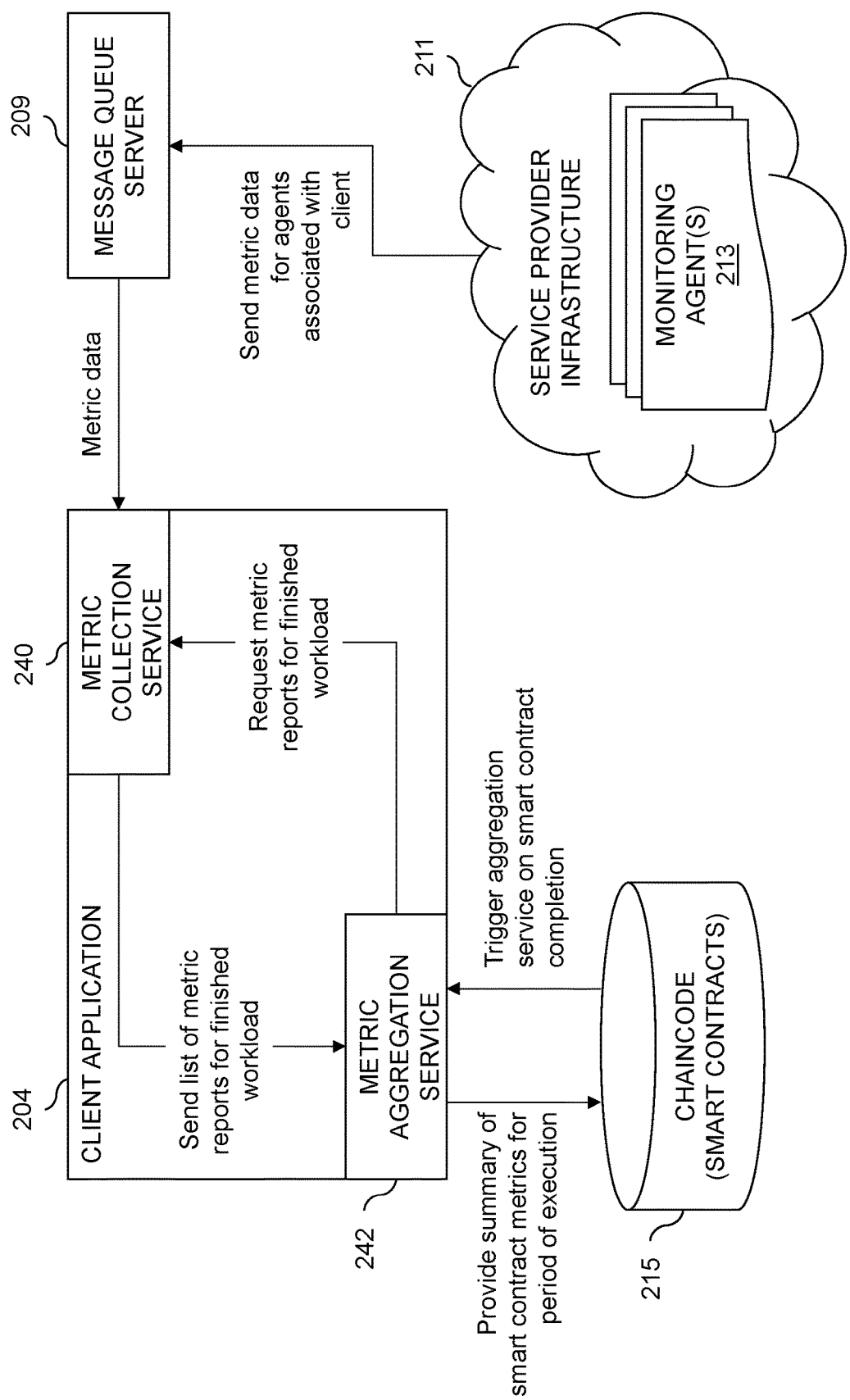
FIG. 5 is a block diagram of monitoring systems in an illustrative embodiment.

Systems and processes for use in generating reputation gauge contracts will be described in further detail below with respect to FIGS. 5-7.

A given instance of a service broker and execution contract may specify one or more service level agreements (SLAs) for provisioning and monitoring of cloud resources. The cloud service contracts serve as bindings between cloud services offered and consumed by the participating clouds, also referred to herein as ledger members. Such a cloud service contract may comprise a cryptographic protocol or other type of software program capable of facilitating, executing, and enforcing the terms of a corresponding cloud resource SLA. It is illustratively self-executing, self-enforcing, multi-dimensional, stateful and binding between provider and consumer clouds.

In some embodiments, a cloud service contract comprises a program that specifies particular cloud resources to be provided or consumed and a timeline of provisioning or consumption along with associated costs in units of designated cryptocurrency. It may also specify a contract completion report with mutual reputation calculation results to be further processed in accordance with a reputation gauge contract.

The cloud service contract program may be encrypted and sent out to other ledger members via the blockchain networks 214. All ledger members may receive the program and each such member comes to an individual agreement with the requesting ledger member regarding the results of the program execution. The blockchain network would then update the distributed ledger to record the execution of the cloud service contract, and then monitor for compliance with the terms of that contract.

In some embodiments, ledger members periodically publish their available cloud resources to other ledger members via resource validation contracts 260. The available cloud resources of all of the ledger members collectively comprise a framework of asset registries. Each ledger member acts as a title registry and escrow agent for its corresponding available cloud resources. Such functionality is implemented in the ledger nodes of the respective clouds.

These embodiments illustratively implement an asset registry system for publishing and recording cloud resources. There may be multiple such registries for each ledger member depending upon the particular types of cloud resources available within the corresponding clouds. The registries may include information such as descriptions of available cloud resources as well as real-time consumption levels for cloud resources. Clouds may be required to demonstrate a designated "proof of stake" in order to become ledger members, such as proof of ownership of certain amounts of cloud resources and/or certain amounts of cryptocurrency for providing payment for cloud services.

As indicated previously, the cloud service contract represents a secure and verifiable binding between a cloud service request from one of the clouds acting as a consumer of cloud services and a corresponding cloud service offer from another one of the clouds acting as a provider of cloud services. The cloud service contract in some embodiments utilizes a contract script language.

Any one of the ledger members can add a remote workload to the system by first sending a workload request to all of the other ledger members. Each such member cloud that is willing to undertake the workload notifies the requesting cloud and the requesting cloud selects one of the notifying clouds. A cloud service contract is then generated and the workload is deployed to the appropriate cloud. Upon completion of the workload or under other conditions, the requesting cloud can delete the workload. The status of the workload during execution may be reflected in one or more blocks that are entered into the distributed ledger collectively maintained by the ledger members.

Figure 8:
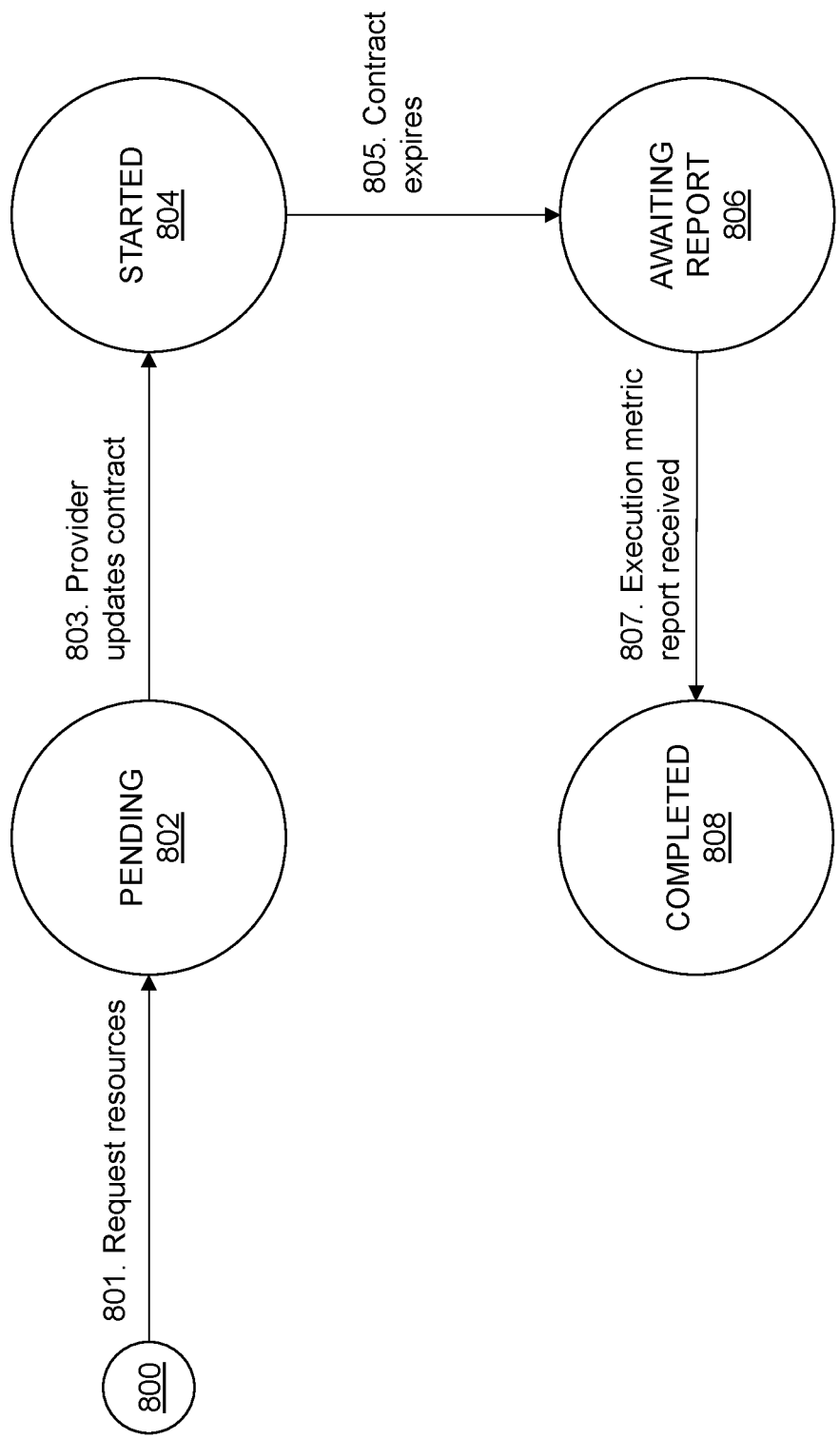
FIG. 8 is a block diagram illustrating a service contract lifecycle in an illustrative embodiment.

Systems and processes for use in generating service broker and execution contracts will be described in further detail below with respect to FIGS. 8 and 9.

Again, numerous additional or alternative smart contracts can be implemented by the smart contract engine 206 of the cloud provider 202-1 in other embodiments, so the resource validation contract 260, network measurement contract 262, reputation gauge contract 264 and service broker and execution contract 266 mentioned above should be considered illustrative examples only.

One or more of the particular smart contracts implemented by the smart contract engine 206 are utilized to generate the new block that is entered into the blockchain ledger 212 and the blockchain networks 214. Any of a wide variety of known cryptographic functions can be applied in generating the cryptographic blocks entered into the blockchain ledger 212 of the blockchain networks 214. Examples of such cryptographic functions can be found in A. J. Menezes et al., "Handbook of Applied Cryptography," CRC Press, August 2001, which is incorporated by reference herein.

In some embodiments, encryption services specified as part of a smart contract can include at least partial payload encryption and/or field level encryption for peer-to-peer workflows. These encryption services can utilize particular encryption types, such as homomorphic encryption, threshold encryption and many others, in order to provide appropriate levels of protection for data of the peer clouds.

A given blockchain distributed ledger in one or more of the embodiments described herein can provide federation of multiple otherwise unrelated clouds at certification and resource definition levels.

For example, various certifications may be required in order for a particular cloud to become a qualified ledger member. This may include providing cloud quality and security certifications, providing remote attestations, agreeing on resource definitions, and providing designated minimum amounts of cloud resources. Clouds offer their resources using these and other resource definitions. Also, clouds can request use of the resources of other clouds using these and other resource definitions. Other examples of resource definitions include a number of virtual machines (VMs) where each such VM is defined in terms of memory resources, CPU resources and network bandwidth. It is also possible in some embodiments to specify other parameters associated with usage of cloud resources of other clouds, including by way of example distance from the local cloud to the remote cloud in terms of round-trip latency.

Figure 3:
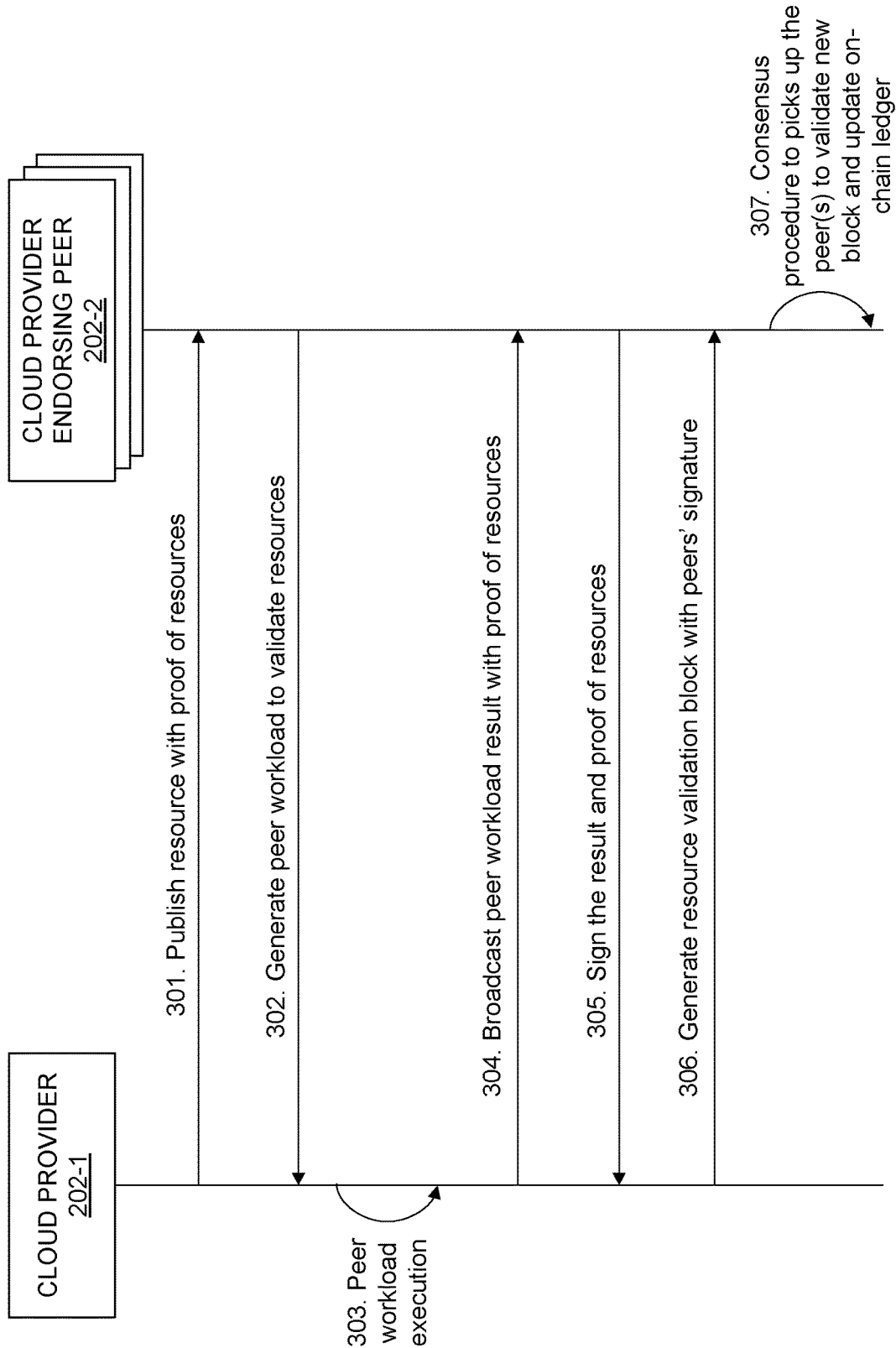
FIG. 3 is a flow diagram for resource registration in an illustrative embodiment.

FIG. 3 shows a flow diagram for resource validation and publishing. A cloud provider administrator can start the resource publishing process by submitting a transaction request through a client application, with the request containing a list of cloud resource types and quantity. Internally, the client application publishes these resources in a two-phase process of (i) requesting validation workloads and (ii) workload execution.

During the requesting validation workloads phase, the client application adds an organization or entity name (e.g., of an associated cloud provider) to a resource publishing request and invokes a RequestValidationWorkload chaincode (e.g., part of a resource validation smart contract) transaction on endorsing peers of other cloud providers. Each cloud provider endorsing peer generates a validation workload using a set of arbitrary inputs, calculates an output of the validation workload, and encrypts the output using a cryptographic key (e.g., a secret advanced encryption standard (AES) key generated at peer startup). The validation workload may be generated specifically for or based on the requested resources to be published. The cloud provider endorsing peers persist the requested resources in the distributed ledger in a pending state for tracking purposes, and then send the generated workload to the client application of the requesting cloud provider.

In the workload execution phase, the client application has received all validation workloads from the cloud provider endorsing peers, and executes those workloads using cloud application programming interfaces (APIs) available through its associated cloud or clouds. The result of each validation workload is packaged into a ValidationResult along with the expected output of the workload in encrypted form. All the ValidationResult objects are then packaged into ValidationResults along with the organization's name, and are used to invoke the ReportValidationResult chaincode transaction on the cloud provider endorsing peers. Each cloud provider endorsing peer iterates through the ValidationResult objects in the request, decrypts the expected result and compares it to the calculated result. If the decryption or comparison fails, the cloud provider endorsing peer responds with an error. Otherwise, the cloud provider endorsing peer removes the resources from the pending state and adds them to an idle bin to complete the resource registration process.

The FIG. 3 flow diagram is assumed to be initiated by a cloud provider administrator of cloud provider 202-1 via the client application 204 running on a cloud of the cloud provider 202-1. In step 301, the cloud provider 202-1 publishes a resource with a proof of resources to the cloud provider endorsing peers 202-2, . . . 202-N. The cloud provider endorsing peers 202-2, . . . 202-N in step 302 generate the resource validation workloads for validating the requested resources, and provide the resource validation workloads to the cloud provider 202-1. The cloud provider 202-1 in step 303 executes the workloads utilizing cloud resources of its associated cloud or clouds. The peer workload results are broadcast to the cloud provider endorsing peers 202-2, . . . 202-N in step 304. The cloud provider endorsing peers 202-2, . . . 202-N sign the results and proof of resources and send such to the cloud provider 202-1 in step 305. The cloud provider 202-1 then generates a resource validation block (e.g., a resource validation smart contract 260) with the signatures of the cloud provider endorsing peers 202-2, . . . 202-N in step 306. In step 307, the cloud provider endorsing peers 202-2, . . . 202-N pick up the peer(s) to validate the new resource validation block and update the on-chain ledger.

Figure 4:
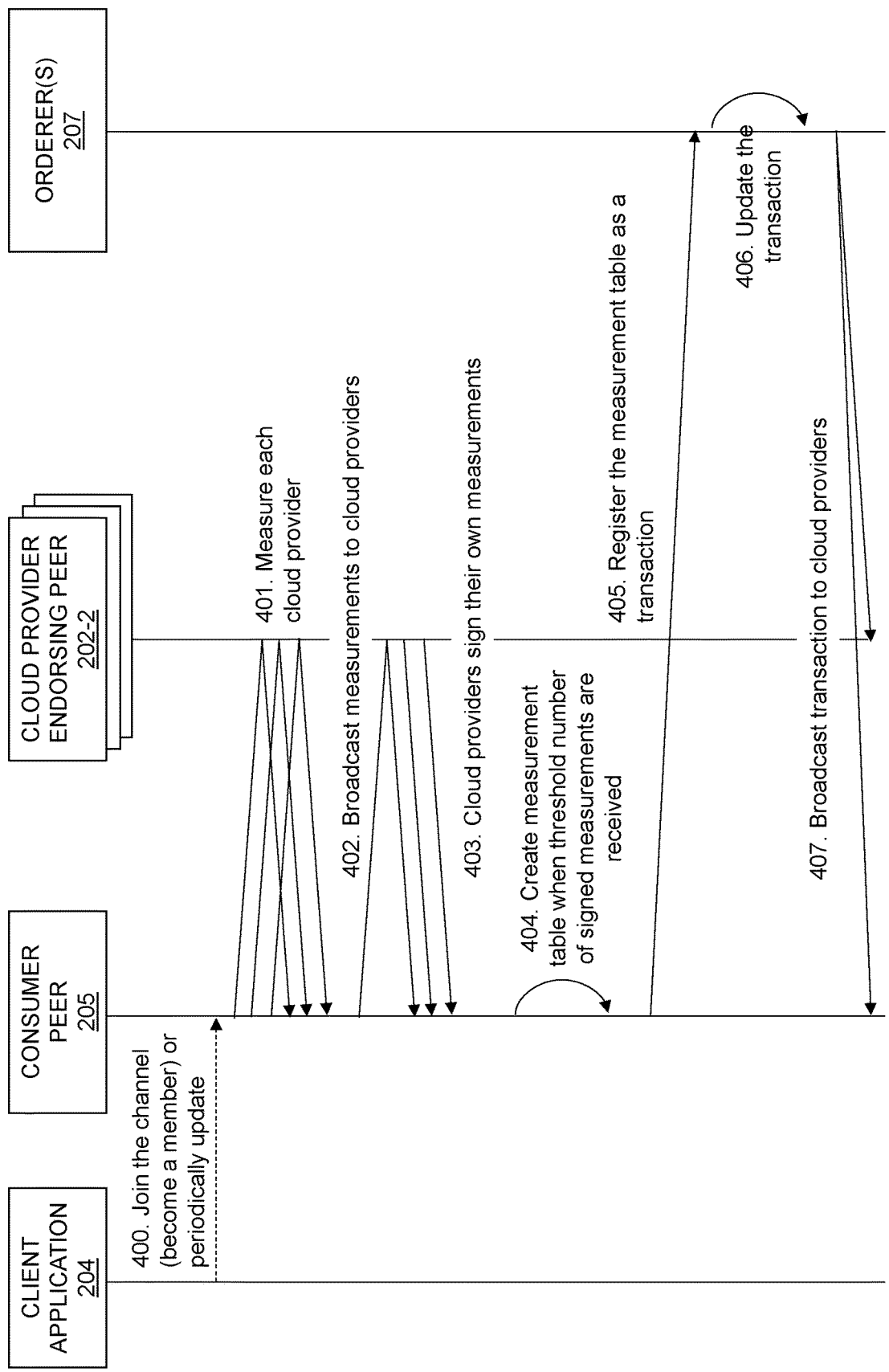
FIG. 4 is a flow diagram for network measurement in an illustrative embodiment.

FIG. 4 shows a flow diagram for network measurement. A network measurement contract may be per-consumer based, and measures the characteristics of the networks between each consumer cloud and the clouds of other cloud providers. The measured results contain one-to-many (e.g., one consumer to many cloud providers) records. Each record may include various parameters, including but not limited to latency and latency variation, bidirectional throughput average, cost for the consumer side and provider side, etc. The FIG. 4 process flow, similar to the FIG. 3 process flow, is assumed to be initiated using client application 204 of cloud provider 202-1.

In step 400, the client application 204 is used to join the channel, or become a member, of a group of cloud providers implementing a distributed ledger. Step 400 may alternatively be used by an existing member of a distributed ledger to periodically update network measurements. The cloud provider 202-1 thus acts as a consumer peer 205, and in step 401 measures the cloud provider endorsing peers 202-2, . . . 202-N. Step 401 may involve, for example, sending one or more packets and measuring the above-described and other network parameters such as latency or latency variation, bidirectional throughput, cost, etc. In step 402, the consumer peer 205 broadcasts the network measurements to the cloud provider endorsing peers 202-2, . . . 202-N. The cloud provider endorsing peers 202-2, . . . 202-N sign their respective network measurements and return the signed measurements to the consumer peer 205 in step 403. The consumer peer 205 in step 404 creates a measurement table, such as when a threshold number of signed measurements are received from the cloud provider endorsing peers 202-2, . . . 202-N.

In some embodiments, step 404 is performed by the consumer peer 205 on receiving a threshold number of signed measurements from the cloud provider endorsing peers 202-2, . . . 202-N, such as on receiving ⅔ of the signed measurements. It is to be appreciated, however, that various other threshold may be used. In some embodiments, the threshold may be a number of signed measurements (e.g., 5, 10, etc.) regardless of the number of cloud provider endorsing peers. In other embodiments, the consumer peer 205 may create the measurement ledger in step 404 after some designated period of time following step 402 regardless of the number of signed measurements that are received, or the consumer peer 205 may wait for all signed measurements before creating the measurement ledger in step 404.

The consumer peer 205 registers the measurement table as a transaction with one or more orderers 207 in step 405. The orders 207 receiver the provider network measurements, update the measurements as a transaction in step 406, and broadcast the transaction to the consumer peer 205 and cloud provider endorsing peers 202-2, ... 202-N in step 407. The network measurement transaction may be entered into the distributed ledger.

While cloud services are being executed, the environments on which workloads of the cloud services are deployed may be continuously monitored for evaluation by the client application 204 of cloud provider 202-1. FIG. 5 illustrates a monitoring system, including the client application 204 implementing a metric collection service 240 and a metric aggregation service 242, a message queue server 209, a service provider infrastructure 211, monitoring agents 213 and smart contracts chaincode 215.

The monitoring agents 213 may be unified monitoring agents, which are the same for each cloud provider that is a member or ledger node of a blockchain distributed ledger. Traditional methods for collecting metric data from cloud environments use a cloud provider's own APIs to retrieve quality of service (QoS) metrics for deployed workloads. Such approaches, however, depend heavily on the honesty of the cloud providers. Further, when different cloud providers utilize different APIs to retrieve QoS metrics or otherwise monitor deployed workloads, it can be difficult to obtain unified measurements suitable for comparison with QoS metrics from other cloud providers.

In some embodiments, unified monitoring agents 213 are deployed in the service provider infrastructure 211 of the various cloud providers that are members or ledger nodes for a blockchain distributed ledger. The monitoring agents 213 are responsible for continuous monitoring of local environments for deployed workloads. The monitoring agents 213 are illustratively configured to run on the same environment as the deployed workloads, and continuously collect statistics from the operating system on which it is running. The monitoring agents 213 may be configured to collect data at different time intervals, as well as specifying the mode of metrics collection whether full or partial such that only certain statistical fields are collected. Representational State Transfer (REST) API endpoints of the monitoring agents 213 may be invoked from the client application 204 to change the configuration of the monitoring agents 213.

The monitoring agents 213 schedule jobs to run (e.g., periodically for designated time intervals), which invoke functions to collect data from the environment and then send the data to a sink or message queue server 209. Because the monitoring agents 213 do not define the scheduled jobs themselves, the jobs can be easily swapped out for other more sophisticated jobs that do more processing, or for simpler jobs as desired. Additionally, the monitoring agents 213 do not process monitoring data themselves, and so the data sink or message queue server 209 can be easily swapped out for a different data sink or message queue server that performs different processing on the monitoring data.

The metric data collected by the monitoring agents 213 can be categorized into two groups: (i) allocated resources; and (ii) evaluated performance. Allocated resources metrics indicate the amount of resources that are being provisioned by the cloud provider to run the workload. Examples of allocated resource metrics include the number of vCPUs, the amount of RAM, etc. The evaluated performance metrics, on the other hand, are measurements of the quality of service that the cloud provider can offer, such as uptime percentage, network bandwidth, disk speeds, etc.

Each time a defined interval passes, the monitoring agents 213 gather statistics from the operating system at that time or instant and use those statistics to create a metric monitoring report. The structure and flow of the monitoring agents 213 is shown in FIG. 6.

Figure 6:
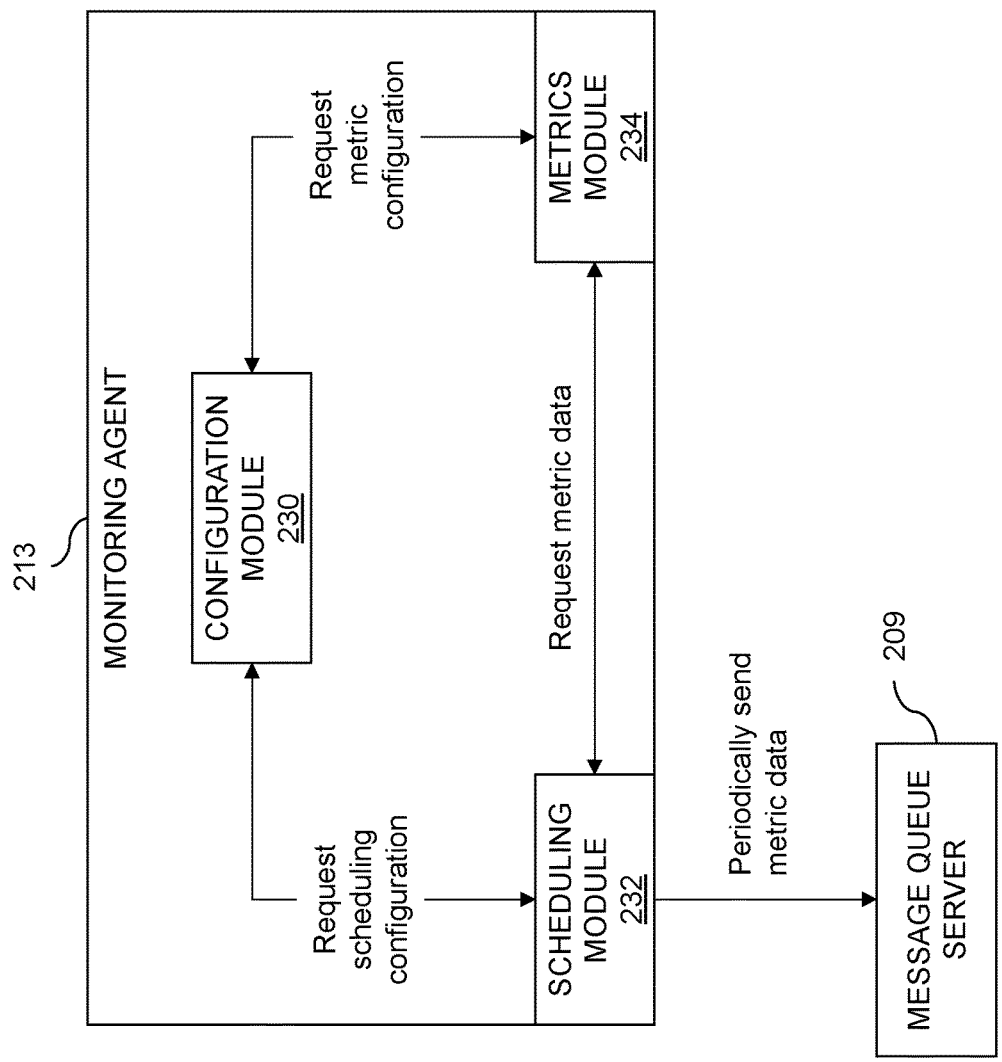
FIG. 6 is a block diagram of a monitoring agent in an illustrative embodiment.

FIG. 6 shows one of the monitoring agents 213 including a configuration module 230, a scheduling module 232 and a metrics module 234. Each of the monitoring agents 213 may have an associated unique identifier (ID), which may be set to the same as the service contract ID that the monitoring agent is associated with. The configuration module 230 may comprise a REST API endpoint that can be invoked by the client application 204 to define information for use in monitoring, such as monitoring scheduling information and requested metrics to be monitored. The scheduling module 232 obtains the scheduling configuration from the configuration module 230, and utilizes the scheduling configuration to request metric data from the metrics module 234. The metrics module 234 obtains request metrics configuration information from the configuration module 230, and provides requested metrics to the scheduling module 232. The scheduling module 232 periodically sends the metric data to message queue server 209.

Returning to FIG. 5, the client application 204 as described above includes metric collection service 240 and a metric aggregation service 242. The metric collection service 240 is responsive for collecting metric monitoring reports from corresponding monitoring agents 213, via the message queue server 209. The metric collection service 240 uses the monitoring agent IDs to categorize received metric monitoring reports according to which monitoring agent generated the metric monitoring report. When the monitoring agent IDs are the same as the service contract IDs, this simplifies the process for determining which service contract the different metric monitoring reports belong to. If the monitoring agent IDs are different from the service contract IDs, the metric collection service 240 may maintain a table or other mapping between monitoring agent IDs and service contract IDs. The metric monitoring reports form the execution metrics history for a given service execution.

Communication between the metric collection service 240 and the monitoring agents 213 may be performed using one or more messaging queues implemented by message queue server 209. The monitoring agents 213 push the metric data to one or more queues in the message queue server 209 that the metric collection service 240 consumes from.

The metric aggregation service 242 is responsible for transforming the metric monitoring history of a service execution, generated by the metric collection service 240, into a service execution metric summary that indicates the quality of the service execution over the whole period of the execution. In some embodiments, this is done by aggregating all the metric history parameters using an appropriate calculation. The appropriate calculation may vary based on the type of metric being aggregated. For some metrics, averaging all the values in the history provides an accurate representation of the execution history (e.g., network or disk speeds). For other metrics like uptime, the average would represent an unrealistic representation. For uptime, the last value of the history may properly represent the monitoring history actual overall uptime. Various other calculations may be used for aggregating other types of metrics.

After the service execution is done, the client application 204 can invoke the metric aggregation service 242 to generate metric summaries. The summary of smart contract metrics for a period of execution may be later used to generate a service fulfillment report which may be required alongside the service contract to calculate the reputation score for the service execution.

The modularity of monitoring systems used in some embodiments enables the easy switching of any component, such as the local monitoring agents 213, which is useful when faced with cloud infrastructures that are powered by different monitoring platforms.

The client application 204 is the starting point for the monitoring system as it hosts the metric collection service 240 and the metric aggregation services 242, along with a messaging queue server 209. Upon deploying a workload, the client application 204 bundles the workload with an associated monitoring agent 213. As described above, the monitoring agent 213 may be given an ID that is the same as the service contract ID for the workload. The monitoring agent 213 is fully configured by the client application 204 to have a specific monitoring interval, a list of metrics to monitor, and a messaging queue to which monitoring data should be pushed to such that the metric collection service 240 of the client application 204 can consume all the metric data being pushed to that message queue.

In some embodiments, a reputation system is used to reward cloud providers for quality of service, and to guarantee the best quality of service for cloud consumers. An important aspect of the reputation system is to maintain an absolute fairness for cloud providers, such that the cloud providers are not rewarded for the amount of the cloud resources that they own or register but they are rewarded for fulfillment of service contracts.

After service execution is completed, monitoring metrics may be collected and aggregated into an execution report that has a summary for the service resources' allocation and performance for the contract period. This execution report is then sent to all cloud provider peers along with the contract identification. When each cloud provider peer receives the execution report and the contract identification, it may determine contract fulfillment. To do so, the cloud provider may: (i) compare each metric with its respective contract term and calculate the percentage fulfilled; (ii) calculate a fulfillment score for the contract by giving each metric a weight and calculating the weighted average for the contract; (iii) calculate an average of all previous contracts between the provider cloud and each other cloud registered (e.g., a contract fulfillment history); (iv) calculate an average of the averages between the provider cloud and every other cloud; and (v) store the new contract fulfillment report along with its score in the distributed ledger as part of the history. This enhanced version of an average algorithm seeks to eliminate an exploitation of having two clouds doing repeated contracts with one another with simple metrics, thus giving a provider cloud high fulfillment scores which would then be a high factor in a final reputation score. By doing an average of averages, a fairly balanced fulfillment score is provided.

Figure 7:
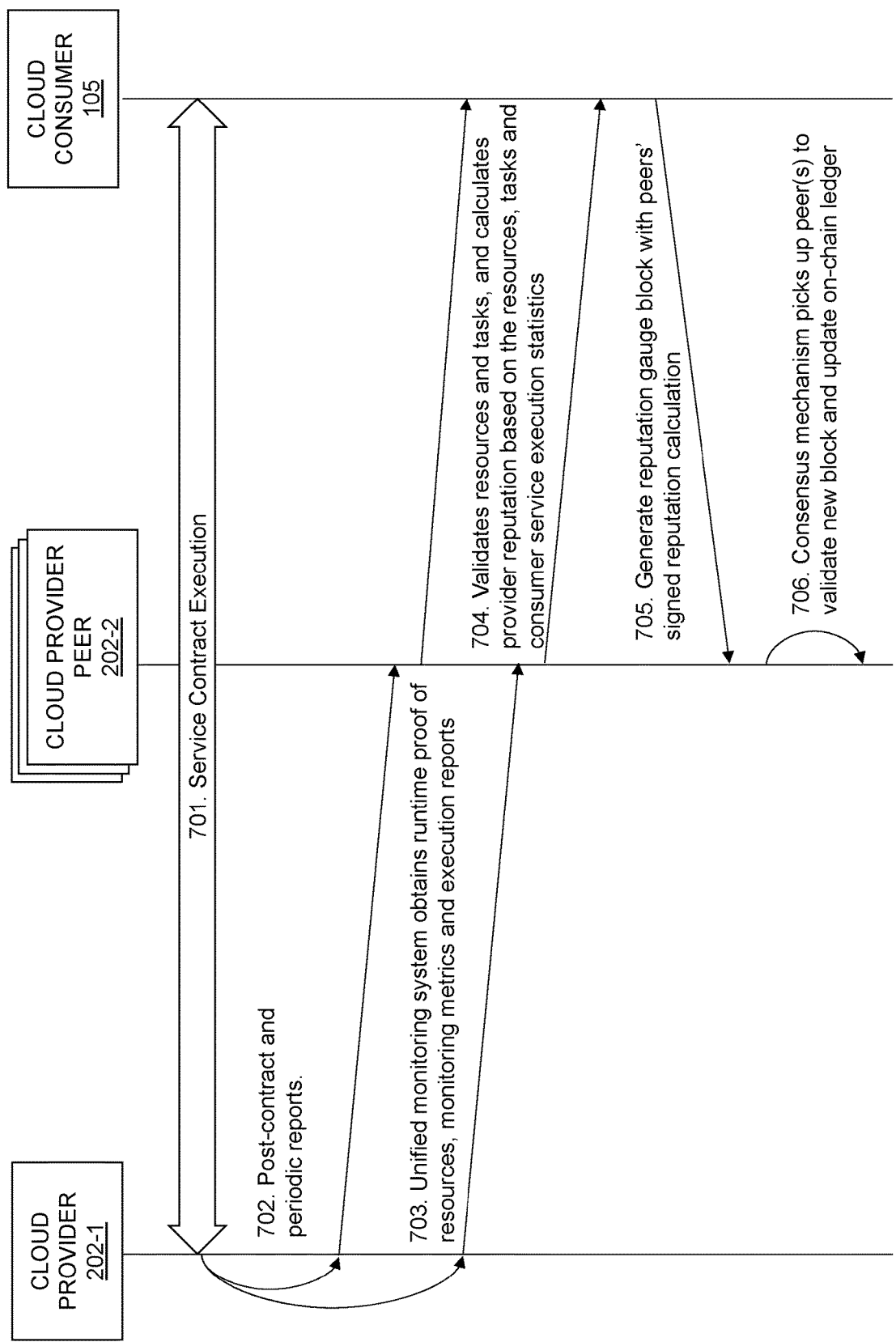
FIG. 7 is a flow diagram for reputation calculation in an illustrative embodiment.

FIG. 7 illustrates a flow for generating reputation gauge blocks for a distributed ledger. In the FIG. 7 flow, it is assumed that cloud provider 202-1 is contracted by cloud consumer 105 in step 701 to execute a service contract. In step 702, periodic reports regarding fulfillment of the service contract executed in step 701 are generated and provided to cloud provider peers 202-2, . . . 202-N. Step 702 may also be performed after execution or after fulfillment of the service contract executed in step 701. In step 703, the cloud provider 202-1 utilizes the unified monitoring system (e.g., a monitoring system as described above in conjunction with FIGS. 5 and 6) to obtain runtime proof of resources, monitoring metrics and execution reports that are provided to the cloud provider peers 202-2, . . . 202-N.

The cloud provider peers 202-2, . . . 202-N validate resources and tasks and calculate a provider reputation based on the resources, tasks and consumer service execution statistics. Such information is provided to the cloud consumer 105 in step 704. The information generated in step 704 may be generated in response to both 702 and 703. Such information may be signed by the respective cloud provider peers 202-2, . . . 202-N. In step 705, the cloud consumer 105 generates a reputation gauge block with the signed reputation calculations received from the cloud provider peers 202-2, . . . 202-N. The cloud provider peers 202-2, . . . 202-N in step 706 utilize a consensus mechanism to pick up peers to validate the new block and update the on-chain ledger.

Service contracts are used to track resource requests and delivery transactions between two organizations, such as between a cloud consumer and a cloud provider. FIG. 8 illustrates a service contract lifecycle state transition. The service contract lifecycle begins in state 800, and a request for resources 801 transitions to the pending state 802. The request for resources 801 may be from a user of an organization or other entity. The resource request 801 may be submitted through an application such as client application 204. The resource request 801 contains a list of the resources needed (e.g., resource types and their quantity), the duration for which the resources are needed (e.g., in seconds, minutes, hours, days, etc.), and a maximum amount of currency that the organization or entity is willing to spend on the requested resources. The application adds the user's organization or entity name to the resource request 801, and invokes the RequestForResources chaincode function on endorsing cloud provider peers.

At the cloud provider endorsing peer side, the resource request 801 goes through a triage to first verify that the requester has enough currency to meet the budget, and second to make sure that the requested resources are available through any other member organization. Once the request is validated by each cloud provider endorsing peer (or by a threshold number or percentage of cloud provider endorsing peers), the automatic process of selecting a cloud provider commences. Various criteria may be used for selecting the cloud provider to service a resource request. In some embodiments, the cloud provider selection involves: (i) finding all organizations or entities (e.g., cloud service providers) operating clouds that can provide the resources which the requester can afford based on the budget; (ii) if there is only one organization meeting (i), that organization is selected as the cloud provider for the resource request 801; (iii) if there is more than one organization meeting (i), the list is narrowed to an organization with the highest reputation; (iv) if there is more than one organization tied for the highest reputation, one or more metrics may be used to select the cloud provider for the resource request 801. In some embodiments, the metrics used in (iv) include a network distance or latency metric used to select the organization with the "closest" cloud as the cloud provider for the resource request 801.

Once the cloud provider is selected, a ServiceContract record is created. The ServiceContract record may include a number of properties, including but not limited to one or more of: (i) a contract identifier; (ii) a requester organization; (iii) a provider organization; (iv) the requester's budget; (v) a duration; (vi) a total cost of the requested resources for the duration (v); (vii) the list of requested resources; and (viii) a contract status in the pending state. The ServiceContract is stored in the distributed ledger, and the RequestForResources chaincode transaction completes successfully.

The service contract remains in the pending state 802 until the access credentials are provided. The cloud provider's application (e.g., client application 204) may monitor chaincode transactions on the distributed ledger and detect when a new contract is initiated. The cloud provider application invokes the cloud provider's cloud APIs to create the requested resources and generate credentials for those resources. The credentials, in some embodiments, include a host uniform resource locator (URL), a username and a password. The cloud provider application packages the credentials, along with a generated cryptographic key (e.g., an AES key), the contract identifier and a time. The time may be the cloud provider application's local time, as the contract timeline may be managed using the cloud provider application's local time. The cloud provider application then invokes an UpdateContract chaincode function on endorsing cloud provider peers.

The cloud provider endorsing peers, on receiving the UpdateContract request, will perform a number of actions to update the service contract record 803 on the distributed ledger to the started state 804. In some embodiments, a cloud provider endorsing peer: (i) verifies that the contract exists; (ii) verifies that the invoking user is authorized to execute this transaction (e.g., that the contract belongs to the resource provider's organization); (iii) encrypt the credentials using the generated cryptographic key (e.g., the AES key) and adds it to the contract; (iv) encrypts the generated cryptographic key (e.g., the AES key) using a public key of the cloud consumer associated with the contract (e.g., the cloud consumer's public RSA key) and adds it to the contract; (v) encrypts the generated cryptographic key (e.g., the AES key) using a public key of the cloud provider (e.g., the cloud provider's public RSA key) and adds it to the contract; (vi) debits the cloud consumer's account with the contract cost; (vii) credits the cloud provider's account with the contract cost; (viii) removes the contract resources from an idle bin; (ix) adds the contract resources to the cloud consumer's borrowed bin; (x) adds the contract resources to the cloud provider's lent bin; (xi) sets the contract start time to the given provider local time; (xii) sets the expiry time to the contract start time plus the contract duration; (xiii) switches the contract status to the started state 804; and (xiv) updates the contract record in the on-chain ledger.

After the service contract is in the started state 804, it is monitored by the cloud provider's client application 204 to detect expiry. When the contract expires 805, the service contract is transitioned to the awaiting report state 806. When execution metric reports are received 807, the service contract is transitioned to the completed state 808. The client application 204, on expiry, invokes a CleanupContracts chaincode function on cloud provider endorsing peers, attaching the client application 204's local time. Upon receiving this request, the cloud provider endorsing peers will query contracts where the invoker's organization is the provider, compare the expiry time of each contract to the given local time and, if the expiry time of the contract is smaller, then the contract is expired. The contract's status is thus moved to the awaiting report state 806. The resources of the service contract may be moved from the clients borrowed bin and the cloud providers lent bin back to the idle bin.

Figure 9:
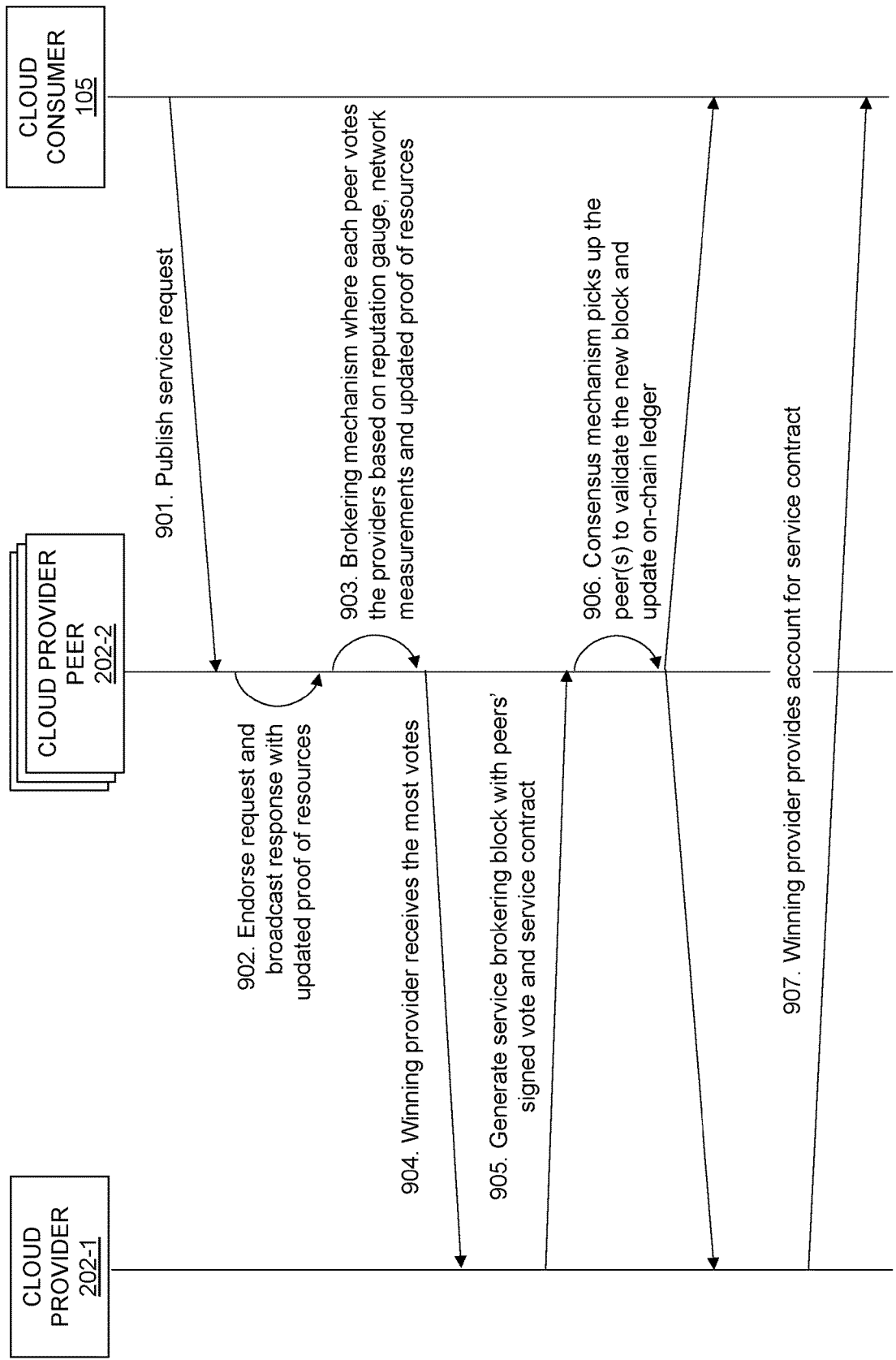
FIG. 9 is a flow diagram for service brokering in an illustrative embodiment.

FIG. 9 shows a flow diagram for service brokering. Cloud consumer 105 publishes a service request in step 901. The service request is provided to a group of cloud provider peers 202-2, . . . 202-N of cloud provider 202-1. Although the cloud provider 202-1 is shown as separate from the cloud provider peers 202-2, . . . 202-N in FIG. 9, it should be appreciated that it may perform the steps 902 and 903 described below along with the cloud provider peers 202-2, . . . 202-N in some embodiments.

In step 902, the cloud provider peers 202-2, . . . 202-N endorse the service request received in step 901, and broadcast a response with updated proof of resources. The cloud provider peers 202-1, . . . 202-N collectively provide a brokering mechanism where each peer votes the cloud providers based on reputation gauge, network measurements and updated proof of resources in step 903. In step 904, the cloud provider 202-1 is selected as the winning provider based on the votes of the cloud provider peers 202-2, . . . 202-N in step 903. In step 905, the cloud provider 202-1 generates a service brokering block, with the cloud provider peers 202-2, . . . 202-N signed votes, along with a service contract including the service request with tasks, service response with resources. The cloud provider peers 202-2, . . . 202-N in step 906 implement a consensus mechanism to pick up peers to validate the new block and update the on-chain ledger. The cloud provider 202-1 in step 907 provides an account for the service contract (e.g., a URL and credentials) for the cloud consumer 105.

With service execution of smart contracts, the selection of a best-fit cloud provider may be performed by all or a group of cloud provider endorsing peers. Cloud provider endorsing peers are appropriate for public auditing and evaluation, offering consensus based brokering services with more powerful computational and communication abilities than regular users.

In some embodiments, a cloud service automation system is built across multiple clouds. The cloud service automation system may be permissioned blockchain based, and includes smart contracts for registering and validating cloud resources, for measuring network connections, for creating a consensus-based cloud service reputation system, for assigning cloud service contracts in a P2P trusted way, etc. The cloud service automation system further provides an off-chain unified monitoring system to provide auditable statistics of cloud resources, services and applications.

Figure 10:
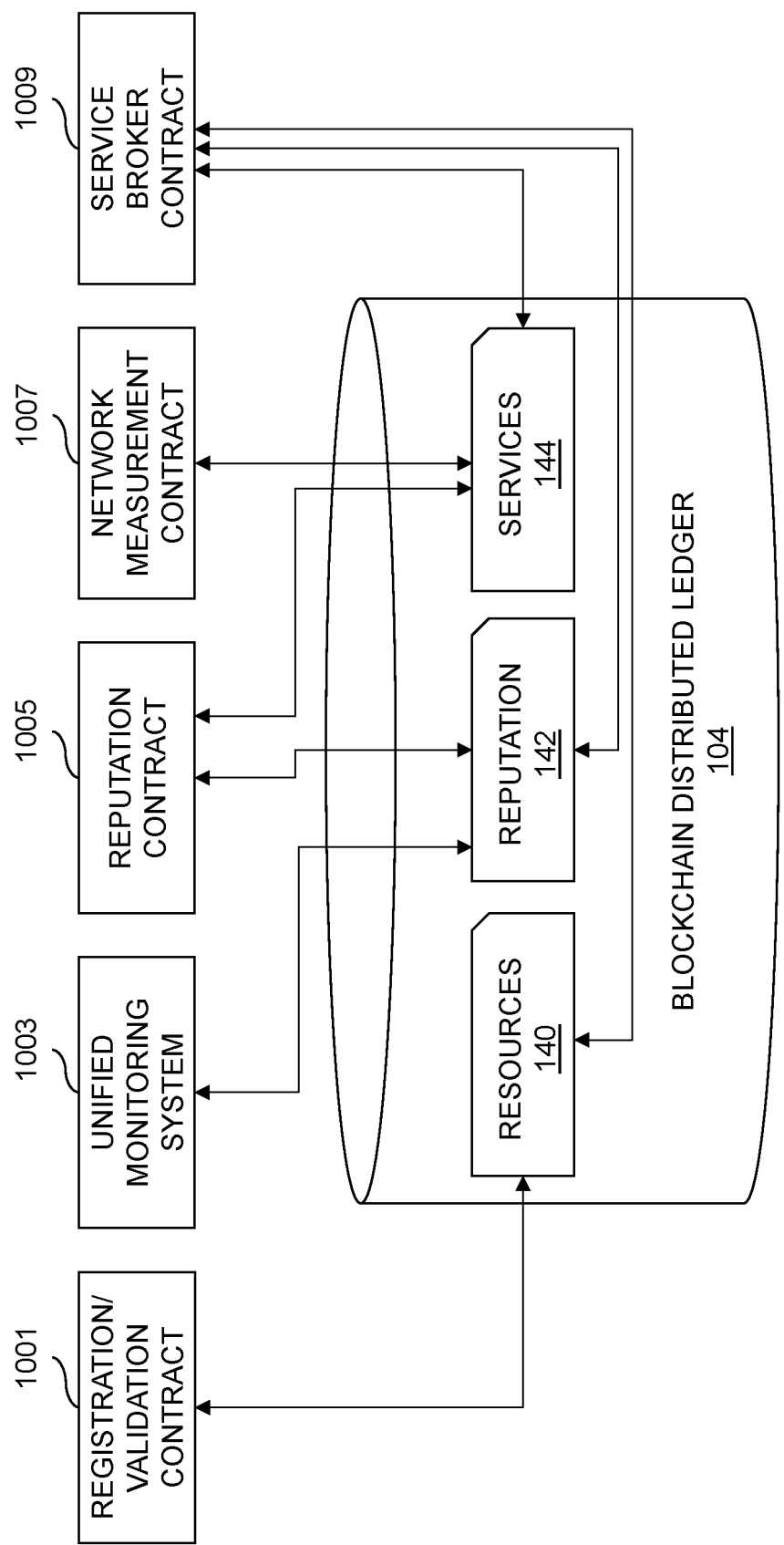
FIG. 10 is a block diagram of assets maintained in a distributed ledger of a cloud services automation system in an illustrative embodiment.

Smart contracts installed on a same channel share the same distributed ledger, e.g., any data stored by one smart contract is visible and editable by other smart contracts. FIG. 10 shows a blockchain distributed ledger 104, which may store information related to cloud resources 140, cloud provider reputation 142 and cloud services 144. Different types of smart contracts and the unified monitoring system may access different information stored in the distributed ledger 104 as illustrated in FIG. 10. For example, registration and validation smart contracts 1001 access the cloud resources information 140 on the distributed ledger 104. The unified monitoring system 1003 accesses the cloud provider reputation information 142 on the distributed ledger 104. Reputation smart contracts 1005 access the cloud provider reputation information 142 and the cloud services information 144 on the distributed ledger 104. Network measurement smart contracts 1007 access the cloud services information 144 on the distributed ledger 104. Service broker smart contracts 1009 access the cloud resources information 140, the cloud provider reputation information 142 and the cloud services information 144 on the distributed ledger 104.

Figure 11:
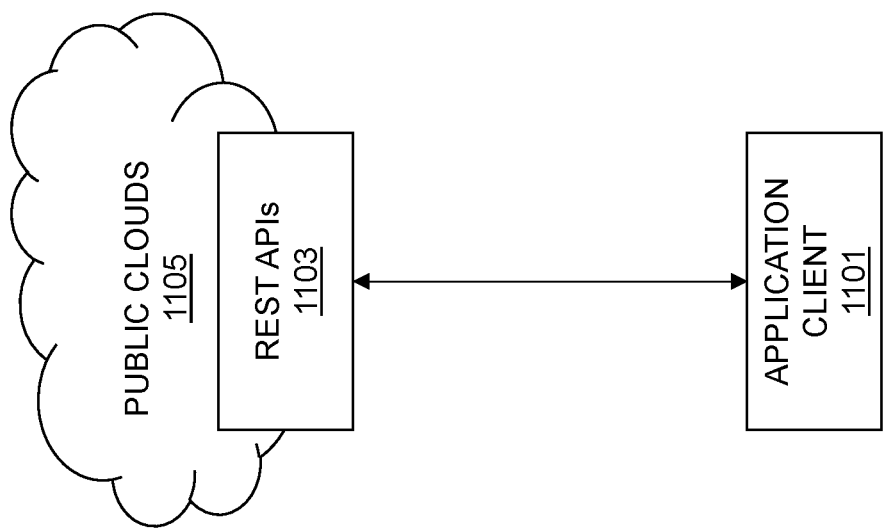
FIGS. 11 and 12 are block diagrams illustrating application programming interfaces for cloud services automation in illustrative embodiments.
Figure 12:
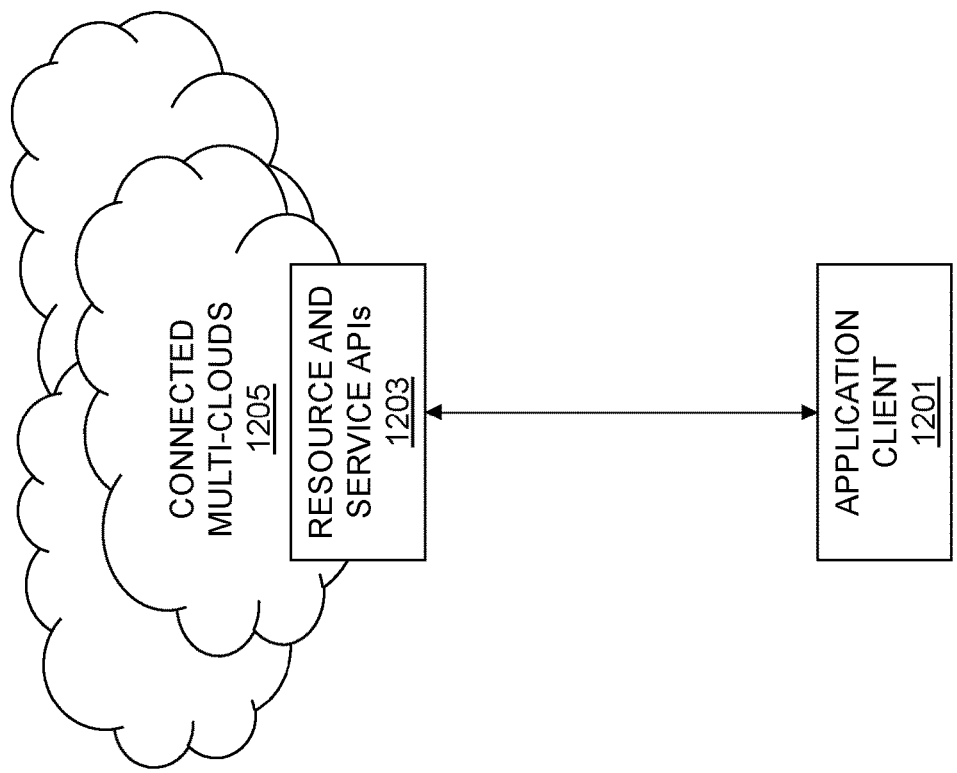

In some embodiments cloud resource acquisition, service brokering and service contract execution may be completely automated, removing a need for human involvement and providing a similar experience with public clouds and multi-clouds. Resource requests and service contract forms can be exposed as external APIs for a cloud provider organization's other systems and components to make use of FIG. 11 illustrates an application client 1101 utilizing REST APIs 1103 to acquire cloud resources and request cloud services from public clouds 1105. FIG. 12 illustrates an application client 1201 that utilizes resource and service APIs 1203 of connected multi-clouds 1205 to acquire cloud resources and request cloud services.

Some embodiments also provide advantages through the design and use of a consensus-based cloud service reputation system. Reputation calculations are included in trustable blockchain smart contracts, and data feeding the reputation calculations may be obtained from a unified monitoring system as described above. By automatically connecting an off-chain unified monitoring system to blockchain smart contracts, cloud provider peers on the same blockchain channel can access one another's cloud service monitoring and network OAM operations at any time during service execution. Thus, any cloud provider peer, not just the consumer peer, is able to participate in the reputation gauge calculation for cloud services. This provides various advantages relative to conventional techniques, such as those which rely on a third-party authority as described above.

Figure 13:
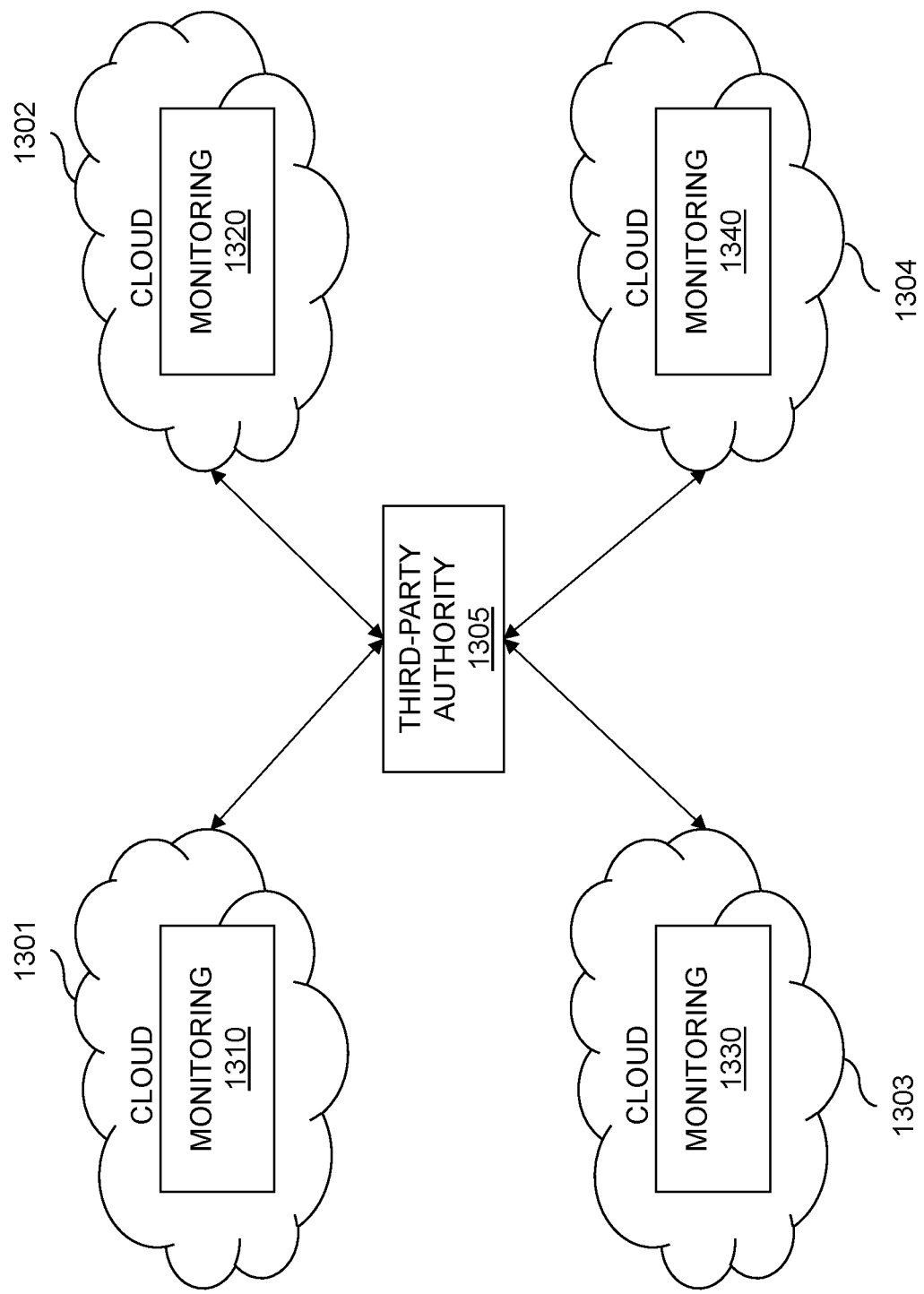
FIG. 13 is a block diagram illustrating cloud services monitoring utilizing a third-party authority in an illustrative embodiment.

FIG. 13 illustrates an arrangement with clouds 1301, 1302, 1303 and 1304 which implement their own monitoring systems 1310, 1320, 1330, and 1340, respectively. Each of the clouds 1301, 1302, 1303 and 1304 may implement different monitoring, such as using proprietary monitoring tools 1310, 1320, 1330 and 1340, and report monitoring data to a third-party authority 1305. Such an arrangement, however, relies on the trustworthiness of the individual clouds 1301, 1302, 1303 and 1304 to accurately report monitoring data and not to cheat, as well as on the trustworthiness of the third-party authority 1305. Such an arrangement further requires the third-party authority 1305 to possibly have to determine mappings or equivalence to harmonize possibly different monitoring data from the different clouds 1301, 1302, 1303 and 1304.

Figure 14:
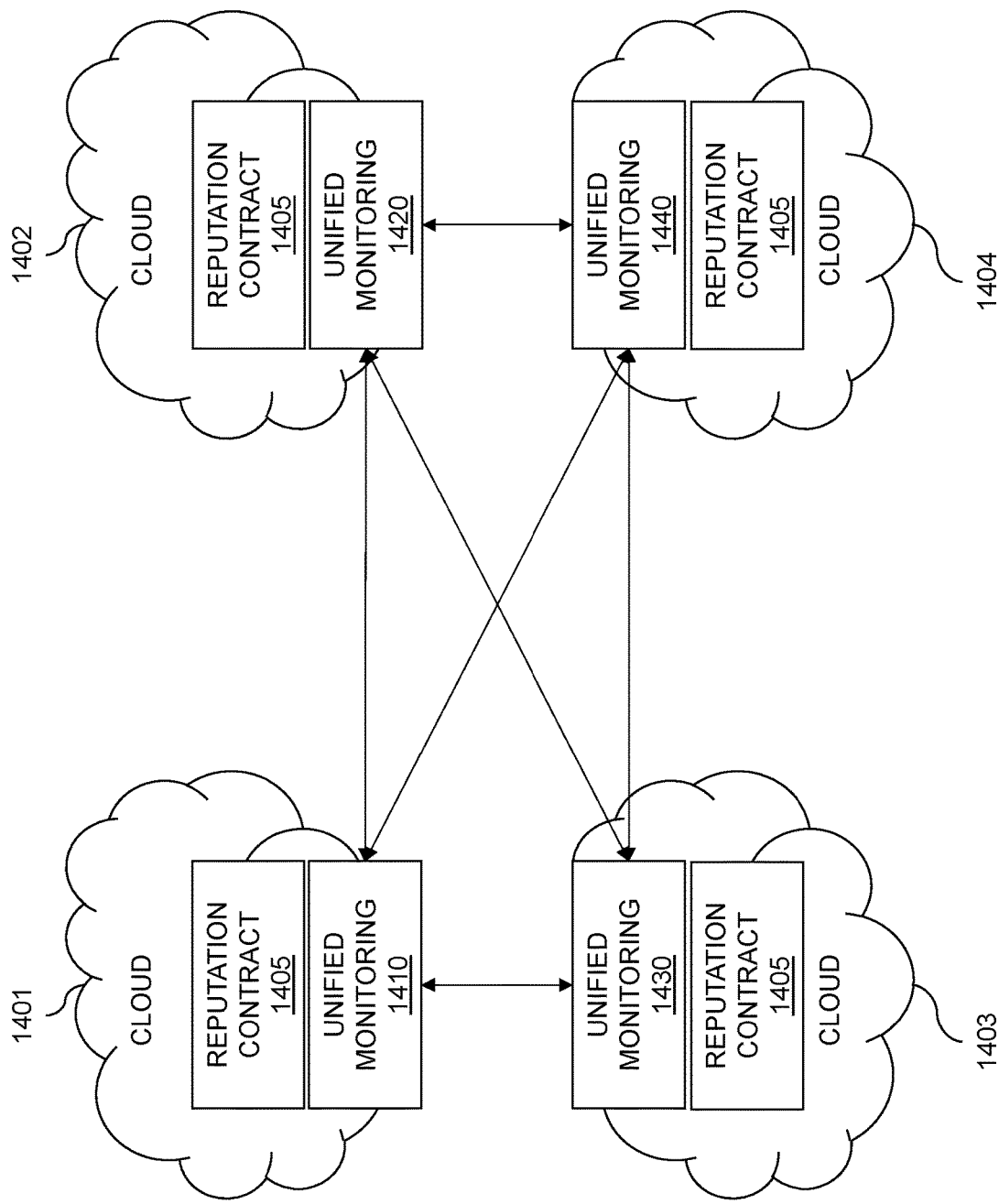
FIG. 14 is a block diagram illustrating cloud services monitoring utilizing a unified monitoring system and distributed ledger in an illustrative embodiment.

FIG. 14 illustrates an arrangement which utilizes a P2P cloud model with unified monitoring for consensus-based cloud service reputation. Clouds 1401, 1402, 1403 and 1404 each implement a unified monitoring system 1410, 1420, 1430 and 1440, respectively. Each of the clouds 1401, 1402, 1403 and 1404 is configured to obtain monitoring data from one another utilizing its respective unified monitoring system 1410, 1420, 1430 and 1440. Utilizing consensus mechanisms described herein, the clouds 1401, 1402, 1403 and 1404 can agree on common reputation contracts 1405 for the different clouds 1401, 1402, 1403 and 1404, where the reputation contracts 1405 are stored in a distributed ledger such as a distributed blockchain ledger.

To prevent oversubscription of resources by any particular cloud provider, automated systems described herein can validate any cloud resources that cloud providers or other organizations want to register. Each endorsing cloud provider peer can generate a validation workload by using an arbitrary set of input parameters and calculating the output and the appropriate time to execute the validation workload. The output is encrypted using the endorsing cloud provider peer's private key, and packaged along with the input parameters into a response that is sent back to the cloud provider seeking to publish cloud resources. The publishing cloud provider executes the received validation workloads, and reports the results to the endorsing cloud provider peers. If the results of each workload executed by the publishing cloud peer matches the encrypted value, the endorsing cloud provider peers register the cloud resources of the publishing cloud peer in the distributed ledger. If results do not match, the registration transaction may be rejected. In some embodiments, the registration transaction is rejected if any of the workload results do not match. In other embodiments, the registration transaction is rejected if a designated threshold number or percentage of the workload results do not match.

Various factors may be taken into account during a cloud service brokering process between a client's request for cloud resources and suitable cloud providers utilizing the automated systems described herein. In some embodiments, the factors include: (i) the cloud providers' reputation; (ii) one-to-many (e.g., one cloud consumer to many potential cloud providers) network measurements (e.g., a cost in terms of distance between the cloud consumer and the potential cloud providers); and (iii) the amount of cloud resources required measured against cloud providers' validated resources. Different parameters may be weighted as desired. For example, the weights of the reputation and network costs may be adjustable, such as based on the type of cloud resources or services requested by the cloud consumer. The service brokering process may be automated and consensus based (e.g., the service brokering process may be executed by a group of endorsing cloud provider peers). This guarantees the selection of clouds of a suitable cloud provider with reasonable networking or other cost.

In some embodiments, monitoring data is collected from all environments that have active workloads on clouds of cloud providers that are members of a distributed ledger. The claimed monitoring data is stored in the distributed ledger as digital assets, which are accessible to the cloud provider peers in the blockchain network for the distributed ledger. This adds an additional layer of transparency and insurance against tampering with reputation values.

The immutability and auditability of cloud provider service reputation and cloud service contract execution, as on-chain digital assets, keeps the cloud providers' honesty in check and improves the fairness of cloud service brokering processes.

Blockchain technology, which may be used to implement distributed ledgers in some embodiments, provides a tamper-proof ledger used for data storage. No data is stored in the distributed ledger without meeting endorsement policies and transaction validation. Various services may be used for executing transaction validation and creating blocks. For example, some embodiments may utilize the Hyperledger ordering service. Blocks which are validated may be broadcast to all cloud provider peers that are members of an associated distributed ledger.

Figure 15:
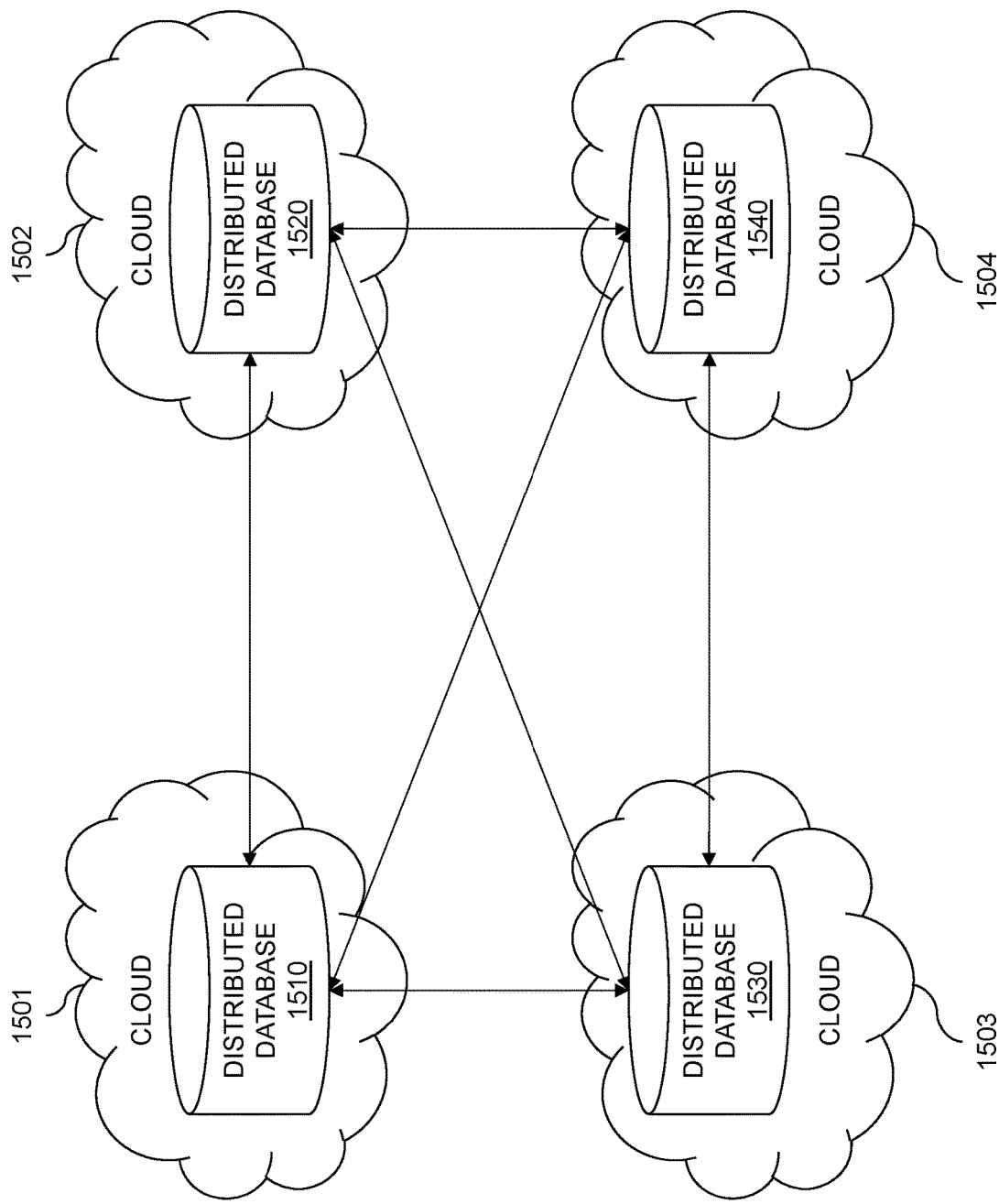
FIG. 15 is a block diagram of a distributed database in a multi-cloud environment in an illustrative embodiment.

FIG. 15 shows clouds 1501, 1502, 1503 and 1504 which implement a distributed storage model, wherein a database is distributed across the clouds 1501, 1502, 1503 and 1504 via respective portions of a distributed database 1510, 1520, 1530 and 1540. Such an arrangement, however, requires replication and duplication processes to be run on the clouds 1501, 1502, 1503 and 1504, and requires communication amongst the distributed database portions 1510, 1520, 1530 and 1540.

FIG. 16, in contrast, illustrates a blockchain distributed storage model, where a blockchain-based ledger 1605 is distributed across clouds 1601, 1602, 1603 and 1604. Due to the properties of blockchain, each cloud 1601, 1602, 1603 and 1604 can provide immutability and auditability of smart contracts that are executed as part of a multi-cloud service automation system described herein.

Blockchain based cloud service automation systems described herein provide a variety of benefits and advantages, such as in multi-cloud and hybrid cloud federations, including benefits and advantages relating to economies of scale, distributed cloud service control, and automated cloud service deployment.

There are numerous use cases for implementations of blockchain based cloud service automation systems described herein, such as in service migration in hybrid clouds, enterprise clouds federation, and cloud resources sharing. Enterprise customers, for example, can use implementations of blockchain based cloud service automation systems to migrate applications automatically from private clouds to public clouds, and vice versa. Large enterprise customers that have many data centers and private clouds can also benefit from implementations of blockchain based cloud service automation systems to federate their data centers and private clouds together to form one large multi-cloud to run cloud services anywhere. Further, enterprises in a same industry (e.g., health care, oil and gas, finance, etc.) can connect their associated clouds into a connected multi-cloud to form a larger, shared P2P cloud federation which utilizes implementations of blockchain based cloud service automation systems described herein.

It is to be appreciated that the foregoing advantages and other advantages referred to herein are merely illustrative of advantages provided in certain embodiments, and need not be present in other embodiments.

As noted above, the private, public and hybrid clouds referred to herein are illustratively implemented by cloud infrastructure comprising one or more processing platforms. Such cloud infrastructure illustratively implements virtualization techniques for implementing virtual machines. The virtualization techniques may include operating system level virtualization techniques such as Linux containers (LXCs). Additionally or alternatively, other types of virtual machines such as those implemented using a hypervisor can be used. The term "virtual machine" as used herein is intended to be broadly construed to encompass, for example, a container implemented using operating system level virtualization, a virtual machine implemented using a hypervisor, or combinations thereof, such as a container configured to run in a hypervisor-based virtual machine.

A given enterprise storage system or other type of external storage system referred to herein is illustratively implemented by one or more storage platforms.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

Storage platforms of the type described above may be part of a processing platform that also implements cloud infrastructure. Portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of at least one cloud or an associated enterprise storage system of the type disclosed herein can be implemented utilizing converged infrastructure.

Peer-to-peer distributed ledger functionality such as that described in conjunction with the embodiments of FIGS. 1-16 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative cloud computing environments can be configured to collectively provide a secure distributed ledger for automating cloud service transactions as disclosed herein.

Peer-to-peer distributed ledger functionality such as that described in conjunction with the diagrams of FIGS. 1-16 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 or 200 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments are presented for purposes of illustration only. Many variations and other alternative embodiments may be used. For example, the disclosed techniques are applicable to a wide variety of other types and arrangements of information processing systems, clouds, networks, distributed ledgers, smart contracts and other elements or components. Also, the particular configurations of system and device elements shown and described in conjunction with the illustrative embodiments of FIGS. 1-16 can be varied in other embodiments. Moreover, the various assumptions made above in the course of describing the illustrative embodiments should also be viewed as exemplary rather than as requirements or limitations of any particular embodiment. Numerous other alternative embodiments within the scope of the appended claims will be readily apparent to those skilled in the art.

What is claimed is:

1. An apparatus comprising: at least one processing device comprising a processor coupled to a memory; wherein the processing device is configured to implement a first ledger node of a first: cloud having a first set of cloud resources; the first ledger node of the first cloud being configured: to communicate over one or more networks with a plurality of additional ledger nodes associated with respective additional clouds having respective additional sets of cloud resources; to monitor auditable information relating, to cloud resources of the first cloud and cloud services provided by the first cloud; to associate the auditable information with one or more cloud service transactions; and to generate a cryptographic block characterizing the one or more cloud service transactions and the associated auditable information; wherein the cryptographic block is entered into a blockchain distributed ledger collectively maintained by the first ledger node and the plurality of additional ledger nodes; wherein the auditable information associated with a given one of the one or more cloud service transactions comprises one or more cryptographically signed proofs of resources; and wherein at: least a given one of the one or more cryptographically signed proofs of resources comprises workload results obtained by the first ledger node executing a given validation workload received from a given one of the plurality of additional ledger nodes.

2. The apparatus of claim 1 wherein the first: ledger node and the plurality of additional ledger nodes collectively maintain the blockchain distributed ledger on a peer-to-peer basis without utilizing a centralized transaction authority.

3. The apparatus of claim 1 wherein the given one of the one or more cloud service transactions comprises a resource validation transaction and wherein generating the cryptographic block comprises: publishing a request for proof of cloud resources of the first cloud to the plurality of additional ledger nodes; receiving, from the plurality of additional ledger nodes, respective validation workloads; executing, utilizing the first set of cloud resources of the first cloud, the respective validation workloads; providing workload results for the respective validation workloads to the plurality of additional ledger nodes; receiving, from the plurality of additional ledger nodes, cryptographically signed proofs of resources; and utilizing the cryptographically signed proofs of resources to generate a resource validation block for entry into the blockchain distributed ledger.

4. The apparatus of claim 3 wherein:
the respective validation workloads are associated with respective expected workload results,
the respective expected workload results are encrypted utilizing cryptographic keys of the plurality of additional ledger nodes; and
the workload results for the respective validation workloads provided to the plurality of additional ledger nodes comprise (i) workload results obtained by the first cloud executing the validation workloads and (ii) the respective expected workload results encrypted utilizing the cryptographic keys of the plurality of additional ledger nodes.

5. The apparatus of claim 1 wherein at least one of the one or more cloud service transactions comprises a network measurement transaction and wherein generating the cryptographic block comprises: measuring network metrics for the additional clouds associated with the plurality of additional ledger nodes; broadcasting the measured network metrics to the plurality of additional ledger nodes; receiving, from the plurality of additional ledger nodes, cryptographically signed network metrics for the additional clouds associated with respective ones of the plurality of additional ledger nodes; and utilizing the cryptographically signed network metrics to generate a network measurement block for entry into the blockchain distributed ledger.

6. The apparatus of claim 5 wherein the network measurement block comprises a one-to-many network measurement record measuring network distance from the first cloud to each of the additional clouds associated with the plurality of additional ledger nodes.

7. The apparatus of claim 6 wherein the one-to-many network measurement record comprises one or more of: latency and latency variation between the first cloud and each of the additional clouds; and bidirectional throughput between the first cloud and each of the additional clouds.

8. The apparatus of claim 1 wherein at least one of the one or more cloud service transactions comprises a cloud service execution transaction and wherein generating the cryptographic block comprises:
receiving, from the plurality of additional ledger nodes, cryptographically signed reputation calculations for a given cloud provider of at least one cloud executing a cloud services contract; and
utilizing the cryptographically signed reputation calculations to generate a reputation gauge block associated with the given cloud provider for entry into the blockchain distributed ledger.

9. The apparatus of claim 1 wherein at least one of the one or more cloud service transactions comprises a reputation gauge transaction and wherein generating the cryptographic block comprises: receiving, from a given one of the plurality of additional ledger nodes, a set of monitoring metrics associated with a given cloud service contract being executed in one or more of the additional clouds operated by a given cloud provider associated with the given additional ledger node; calculating a fulfillment score for the given cloud service contract based at least in part on comparing the set of monitoring metrics with corresponding cloud service parameters of the given cloud service contract; generating a reputation calculation for the given cloud provider utilizing the fulfillment score; signing the reputation calculation utilizing a cryptographic key associated with a cloud provider of the first cloud; and providing the signed reputation calculation to a cloud consumer associated with the given service contract; wherein the signed reputation calculation from the first ledger node and one or more additional signed reputation calculations from one or more of the plurality of additional ledger nodes are utilized to generate a reputation gauge block associated with the given cloud provider for entry into the blockchain distributed ledger.

10. The apparatus of claim 1 wherein at least one of the one or more cloud service transactions comprises a cloud service brokering transaction and wherein generating the cryptographic block comprises: receiving a request to execute a given cloud service contract from a cloud consumer; identifying one or more of the first cloud associated with the first ledger node and the additional clouds associated with the plurality of additional ledger nodes that are capable of satisfying the request; and selecting at least one cloud associated with one of the first ledger node and the plurality of additional ledger nodes for executing the given cloud service contract based at least in part on reputation calculations associated with cloud providers of the clouds associated with the first ledger node and the plurality of additional ledger nodes; wherein the ledger node associated with the selected cloud generates a service brokering block for the given service contract for entry into the biockchain distributed ledger.

11. The apparatus of claim 10 wherein selecting the cloud for executing the given cloud service contract is further based at least in part on network metrics associated with the cloud providers of the clouds associated with the first ledger node and the plurality of additional ledger nodes.

12. The apparatus of claim 1 wherein monitoring auditable information relating to cloud resources of the first cloud and cloud services provided by the first cloud comprises: deploying one or more monitoring agents on service provider infrastructure of the first cloud executing one or more workloads associated with cloud service contracts; configuring the one or more monitoring agents to invoke functions to collect monitoring metric data from operating environments of the one or more workloads; collecting monitoring metric data for the one or more workloads from the one or more monitoring agents; and aggregating the monitoring metric data for each workload to generate cloud service fulfillment reports for the cloud service contracts.

13. The apparatus of claim 12 wherein the monitoring metric data comprises allocated resource metric data and evaluated performance metric data, the allocated resource metric data specifying an amount of resources provisioned to run an associated workload and the evaluated performance metric data specifying measurements of quality of service provided by the first cloud for the associated workload.

14. The apparatus of claim 12 wherein a given one of the monitoring agents comprises a representational state transfer (REST) application programming interface (API) endpoint, and wherein the first ledger node of the first cloud is configured to invoke the REST API endpoint of the given monitoring agent to adjust a configuration of the given monitoring agent.

15. The apparatus of claim 14 wherein adjusting the configuration of the given monitoring agent comprises at least one of: specifying time intervals at which the given monitoring agent collects monitoring metric data for an associated workload; and specifying which monitoring metrics to collect for the associated workload.

16. The apparatus of claim 12 wherein the one or more monitoring agents comprise unified monitoring agents configured for continuous monitoring of local environments associated with the one or more workloads running in the first cloud.

17. A method comprising: implementing a first ledger node of a first cloud having a first set of cloud resources; configuring the first ledger node to communicate over one or more networks with a plurality of additional ledger nodes associated with respective additional clouds having respective additional sets of cloud resources; monitoring in the first ledger node auditable information relating to cloud resources of the first cloud and cloud services provided by the first cloud; associating the auditable information with one or more cloud service transactions; and generating a cryptographic block characterizing the one or more cloud service transactions and the associated auditable information; wherein the cryptographic block is entered into a blockchain distributed ledger collectively maintained by the first ledger node and the plurality of additional ledger nodes; wherein the auditable information associated with a given one of the one or more cloud service transactions comprises one or more cryptographically signed proofs of resources; wherein at least a given one of the one or more cryptographically signed proofs of resources comprises workload results obtained by the first ledger node executing a given validation workload received from a given one of the plurality of additional ledger nodes; and wherein the method is performed by at least one processing device comprising a processor coupled to a memory.

18. The method of claim 17 wherein the first ledger node and the plurality of additional ledger nodes collectively maintain the blockchain distributed ledger on a peer-to-peer basis without utilizing a centralized transaction authority.

19. A computer program product comprising a non-transitory processor-readable storage medium having stored therein program code of one or more software programs, wherein the program code when executed by at least one processing device comprising a processor coupled to a memory causes the processing device: to implement a first ledger node of a first cloud having a first set of cloud resources; to configure the first ledger node to communicate over one or more networks with a plurality of additional ledger nodes associated with respective additional clouds having respective additional sets of cloud resources; to monitor in the first ledger node auditable information relating to cloud resources of the first cloud and cloud services provided by the first cloud; to associate the auditable information with one or more cloud service transactions; and to generate a cryptographic block characterizing the one or more cloud service transactions and the associated auditable information; wherein the cryptographic block is entered into a blockchain distributed ledger collectively maintained by the first ledger node and the plurality of additional ledger nodes; wherein the auditable information associated with a given one of the one or more cloud service transactions comprises one or more cryptographically signed proofs of resources; and wherein at least a given one of the one or more cryptographically signed proofs of resources comprises workload results obtained by the first ledger node executing a given validation workload received from a given one of the plurality of additional ledger nodes.

20. The computer program product of claim 19 wherein the first ledger node and the plurality of additional ledger nodes collectively maintain the blockchain distributed ledger on a peer-to-peer basis without utilizing a centralized transaction authority.

\* \* \* \* \*